United States Patent Office 3,629,303
Patented Dec. 21, 1971

3,629,303
6-ALKOXY - 16 - ALKYLIDENE - 17α - LOWER ALKANOYLOXY-21-DESOXY - 4,6 - PREGNA-DIENES, METHODS FOR THEIR MANUFACTURE AND INTERMEDIATES PRODUCED THEREBY
Richard Rausser, Union, and Robert Tiberi, Englishtown, N.J., assignors to Schering Corporation, Bloomfield, N.J.
No Drawing. Filed June 9, 1969, Ser. No. 831,739
Int. Cl. C07c *169/34*
U.S. Cl. 260—397.4         26 Claims

ABSTRACT OF THE DISCLOSURE

6 - alkoxy-16-lower alkylidene-17α-lower alkanoyloxy-4,6 - pregnadiene - 3,20-diones and 1α,2α-cyclomethylene derivatives thereof having progestational and anti-androgenic activity are prepared by treating a 6-keto-16-lower alkylidene - 17α-lower alkanolyoxy-4-pregnane-3,20-dione with boron trifluoride is a lower alkanol.

Preferred compounds are 6-methoxy-16-lower alkylidene - 17α-lower alkanoyloxy-4,6-pregnadiene-3,20-diones (particularly 6-methoxy-16 - methylene-17α-acetoxy-4,6-pregnadiene-3,20-dione) and their 1α,2α-cyclomethylene derivatives, which are valuable in the treatment of benign prostatic hypertrophy. These 6-methoxy compounds are also prepared by reaction of a 16-lower alkylidene-17α-lower alkanoyloxy-4-pregnene-3,20-dione or a 3-enol ether or 3-enol ester derivative thereof with a cupric halide in methanol.

The 1α,2α - cyclomethylene-6-alkoxy-16-lower alkylidene - 17α-lower alkanoyloxy-4,6-pregnadiene-3,20-diones are also prepared from a 6-alkoxy-16-lower alkylidene-17α-lower alkanoyloxy-1,4,6-pregnatriene-3,20-dione by reaction with dimethylsulfoxonium methylide.

FIELD OF INVENTION

This invention relates to compositions of matter which may be classified as 6-lower alkoxy-lower alkylidene-17α-lower alkanoyloxy-6-dehydro derivatives of steroids of the progesterone series, to methods for their manufacture, and to intermediates produced thereby.

SUMMARY OF INVENTION

The invention sought to be patented in the first composition of matter aspect resides in the concept of a steroid of the progesterone series which has an additional double bond between C–6 and C–7 and 6-lower alkoxy-16-lower alkylidene-17α-lower alkanoyloxy substituents, said steroids possessing progestational and anti-androgenic activity. A preferred species of this aspect of our invention are 6-methoxy-16-methylene-21-unsubstituted pregnane derivatives, praticularly 6-methoxy-16-methylene-17α-acetoxy-4,6-pregnadiene-3,20-dione, which demonstrates high anti-androgenic activity in tests in the rat and in dogs and is valuable as a therapeutic agent for use in the treatment of benign prostatic hypertrophy.

The invention sought to be patented in a second composition-of-matter aspect resides in the concept of steroids of the 6-dehydroprogesterone series and of the 1,6-bis-dehydroprogesterone series which have 6-lower alkoxy-16-lower alkylidene-17α-hydroxy substituents, as well as steroids of the 1,6-bis-dehydroprogesterone series having 6-lower alkoxy-16-lower alkylidene-17α-lower alkanoyloxy substituents, all of said compounds, being valuable as intermediates in the preparation of the therapeutically valuable compounds of the first composition of matter aspect of our invention.

The invention sought to be patented in a third composition of matter aspect resides in the concept of 6-keto-16-lower alkylidene-17α-lower alkanoyloxy progesterones which are valuable as intermediates in preparing 6-alkoxy-16-lower alkylidene-17α-lower alkanoyloxy 6-dehydroprogesterones of our invention.

There are also three process aspects of this invention. Of these, the invention sought to be patented in the first process aspect resides in the concept of preparing 6-methoxy-16-lower alkylidene-17α-lower alkanoyloxy-4,6-pregnadiene-3,20-diones (i.e. 6-methoxy-16-lower alkylidene-17α-lower alkanoyloxy-6-dehydrogrogesterones) by treatment of a member of the group consisting of a 16-lower alkylidene-17α-lower alkanoyloxy-4-pregnene-3,20-dione having saturated carbons at C–6 and C–7, a 3-enol lower alkoxy derivative thereof, and a 3-enol lower alkanoyloxy derivative thereof, in methanol, with a cupric halide of the group consisting of cupric bromide and cupric chloride.

A preferred species of this process is that wherein the starting steroid is a 16-lower alkylidene-17α-lower alkanoyloxy-4-pregnene-3,20-dione, particularly 16-methylene-17α-acetoxyprogesterone, whereby is prepared the preferred species of the first composition of matter aspect of this invention, i.e. 6-methoxy-16-methylene-17α-acetoxy-6-dehydroprogesterone.

The invention sought to be patented in a second process aspect of this invention resides in the concept of treating a 6-keto-16-lower alkylidene-17α-lower alkanoyloxy-4-pregnene-3,20-dione in a lower alkanol with an acid catalyst such as mineral acids, p-toluenesulfonic acid, and, preferably, borontrifluoride whereby is formed a 6-lower alkoxy-16-lower alkylidene-17α-lower alkanoyloxy-4,6-pregnadiene-3,20-dione.

A preferred species of this process is that wherein the 6-keto-16 - lower alkylidene-17α-lower alkanoyloxy-4-pregnene-3,20-dione starting compound is prepared from a 6-methoxy-16-lower alkylidene-17α-lower alkanoyloxy-4,6-pregnadiene-3,20-dione of this invention by acid hydrolysis, i.e. by treatment with such as hydrogen chloride, hydrogen bromide, sulfosalicylic acid, and p-toluenesulfonic acid in aqueous acetic acid as solvent. The second process aspect of our invention thus provides a convenient method of preparing higher 6-alkoxy analogs of our invention, e.g. 6-ethoxy derivatives, from the corresponding 6-methoxy compounds.

A third process aspect of this invention resides in the concept of preparing 1α,2α-cyclomethylene - 6 - lower alkoxy-16-lower alkylidene-17α-hydroxy-4,6-pregnadiene-3,20-diones and the 17-lower alkanoic acid esters thereof by treating a member selected from the group consisting of 6-lower alkoxy-16-lower alkylidene-17α-hydroxy-1,4,6-pregnatriene-3,20-diones and the 17-lower alkanoic acid esters thereof with a methylene transfer agent, e.g. dimethylsulfoxonium methylide prepared in situ by reaction of trimethylsulfoxonium iodide with sodium hydride in dimethylsulfoxide.

GENERAL DESCRIPTION OF THE INVENTION

First composition of matter aspect

The first composition of matter aspect of our invention includes 6 - alkoxy-16-alkylidene-6-dehydroprogesterones of the following structural Formula I:

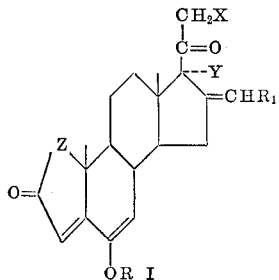

wherein R is lower alkyl; $R_1$ is a member selected from the group consisting of hydrogen and lower alkyl; X is a member selected from the group consisting of hydrogen, fluorine, and chlorine; Y is lower alkanoyloxy; and Z is a member selected from the group consisting of

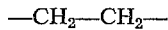

and

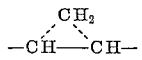

By the term "lower alkyl" is contemplated hydrocarbon radicals having preferably up to four carbon atoms such as methyl, ethyl, n-propyl, isopropyl, n-butyl, sec.-butyl, and t-butyl, although higher homologs such as pentyl and hexyl come within the scope of this invention.

The term "lower alkanoyloxy" is contemplated as including hydrocarbon carboxylic acid radicals of lower alkanoic acids having preferably up to eight carbon atoms such as radicals obtained from acetic, propionic, valeric, caprylic, caproic, t-butyl-acetic acid and the like.

Our invention thus includes 6-lower alkoxy-16-lower alkylidene-17α-lower alkanoyloxy-6-dehydroprogesterones unsubstituted at C–1 and C–2 (i.e. compounds of Formula I wherein Z is —CH₂—CH₂—) such as:

6-methoxy-16-methylene-17α-acetoxy-4,6-pregnadiene-3,20-dione (i.e. 6-methoxy-16-methylene-17α-acetoxy-6-dehydroprogesterone),
6-methoxy-16-methylene-17α-propionoxy-4,6-pregnadiene-3,20-dione,
6-methoxy-16-ethylidene-17α-acetoxy-4,6-pregnadiene-3,20-dione,
6-methoxy-16-methylene-17α-acetoxy-21-fluoro-4,6-pregnadiene-3,20-dione,
6-ethoxy-16-methylene-17α-acetoxy-4,6-pregnadiene-3,20-dione, and also includes 1α,2α-cyclomethylene-6-alkoxy-16-lower alkylidene-6-dehydroprogesterones (i.e. compounds of Formula I wherein Z is

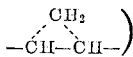

exemplified by

1α,2α-cyclomethylene-6-methoxy-16-methylene-17α-acetoxy-4,6-pregnadiene-3,20-dione,
1α,2α-cyclomethylene-6-ethoxy-16-methylene-17α-acetoxy-4,6-pregnadiene-3,20-dione,
1α,2α-cyclomethylene-6-methoxy-16-methylene-17α-acetoxy-21-fluoro-4,6-pregnadiene-3,20-dione; and
1α,2α-cyclomethylene-6-methoxy-16-methylene-17α-valeroxy-4,6-pregnadiene-3,20-dione.

The new compounds defined by Formula I possess valuable pharmacological and therapeutic properties and may be used as medicaments in conditions requiring a progestational agent, e.g. in fertility control and in the management of various menstrual disorders. They may be administered via the oral or intramuscular route in a manner similar to that in which known progestational agents, e.g. progesterone, are administered, the dosage depending on the age and size of the patient and in the nature and severity of the ailment being treated. The progestational activity of compounds of Formula I was demonstrated in studies in immature rats by the well known Clauberg method via the oral and intramuscular route. For example, in this test, 6 - methoxy-16-methylene-17α-acetoxy-4,6-pregnadiene-3,20-dione is about six times as active as progesterone via the oral route and about 14 times as active as progesterone via the intramuscular route.

Our new compounds find their greatest use in the treatment of disorders requiring anti-androgen therapy such as in the treatment of acne, or benign prostatic hypertrophy. The anti-androgenic activity of compounds of Formula I was studied in the intact male immature rat by the test described by R. O. Neri et al., Eur. J. Pharm. 1, 438–444 (1967) (Section 2.1.2, p. 439). It was demonstrated that at 10 mgm./kgm. doses administered subcutaneously in sesame oil, anti-androgenic activity was exhibited by compounds of Formula I such as 6-methoxy-16-methylene - 17α - acetoxy-4,6-pregnadiene-3,20-dione, 6 - ethoxy - 16 - methylene-17α-acetoxy-4,6-pregnadiene-3,20 - dione, and 1α,2α - cyclomethylene-6-methoxy-16-methylene-17α-acetoxy-4,6-pregnadiene-3,20 - dione. The anti-androgenic activity of 6-alkoxy-16-alkylidene-17α-lower alkanoyloxy - 6 - dehydroprogesterones was also studied in orchiectomized rats by the test described by R. O. Neri et al., Eur. J. Pharm. 1, 438–444 (1967) (Section 2.1.1, page 438). It was found, for example, that at 25 mgm./kg. doses administered subcutaneously to orchiectomized rats, 6 - methoxy - 16 - methylene - 17α-acetoxy-4,6-pregnadiene-3,20-dione inhibited the testosterone (50 mμ) induced hypertrophy of the secondary sex structures, thus exhibiting anti-androgenic activity. The anti-androgenic activity of compounds of Formula I is also demonstrated by results of studies in old male dogs having hyperplastic prostates by the method described by R. O. Neri et al., Endocrinology 82, 311 (1968). It was found, for example, when 6-methoxy-16-methylene-17α-acetoxy-4,6-pregnadiene - 3,20 - dione was injected intramuscularly at 5 mg./kg. doses daily for six weeks or was administered orally at 15 mgm./kg. doses daily for six weeks, to dogs having prostatic hyperplasia, that prostatic volumes and epithelial cell heights were reduced and that the acid phosphatase and protein content of the hyperplastic prostate were also reduced and the symptoms of prostatic hyperplasia alleviated.

Our compounds are most valuable for use in the treatment of benign prostatic hypertrophy which occurs spontaneously in man as well as in dogs. Of the compounds of Formula I, a preferred species for the treatment of benign prostatic hypertrophy is 6-methoxy-16-methylene-17α-lower alkanoyloxy-4,6-pregnadiene-3,20-dione.

When treating a male mammal, e.g. a dog, having benign prostatic hypertrophy, the active compounds of Formula I of this invention can be administered orally in the form of tablets, capsules, elixirs and the like or may be administered by parenteral injection. In tablet form they are compounded with an inert pharmaceutical carrier which may contain a suitable binder such as, for example, gums, starches and sugars. They may also be incorporated into gelatin capsules or formulated into elixirs which have the advantage of being susceptible to manipulations in flavor by the addition of standard natural or synthetic flavoring agents. Highly satisfactory administration may also be achieved in the form of aqueous parenteral suspensions. Preferably, these formulations are so proportioned as to afford a unit dosage of from about 1 to about 100 mg. of active ester. Particularly preferred are unit dosages ranging from about 5 to about 25 mg.

Typical formulations incorporating the active 6-alkoxy-16-lower alkylidene-17α-lower alkanoyloxy-6-dehydroprogesterone of this invention are described hereinbelow as Formulations I to III.

In order to achieve a satisfactory response in the treatment and control of benign prostatic hypertrophy with, for example, 6-methoxy-16-methylene-17α-acetoxy-4,6-pregnadiene-3,20-dione, it is necessary to administer daily 1 to 4 tablets or capsules having from about 1 to about 100 mgm. unit doses. The usual injection dosage is 1 to 4 ml. per day comprising a total daily dosage of from about 0.5 to 50 mgm. In severe or aggravated conditions additional medication may be administered.

Second composition of matter aspect

The invention sought to be patented in the second composition of matter aspect includes compounds defined by the following structural Formula II which are valuable, mainly as intermediates in the third process aspect of this invention.

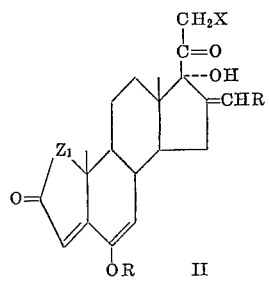

II wherein R is lower alkyl; $R_1$ is a member selected from the group consisting of hydrogen and lower alkyl; X is a member selected from the group consisting of hydrogen, fluorine and chlorine; and $Z_1$ is a member selected from the group consisting of —$CH_2$—$CH_2$—, —CH=CH—, and

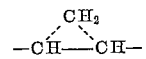

and when $Z_1$ is —CH=CH—, the 17α-lower alkanoate esters thereof.

The compounds of Formula II thus include 17α-hydroxy precursors of the 17α-lower alkanoate therapeutically valuable compounds of our invention (Formula I hereinabove) such as 6-methoxy-16-methylene-17α-hydroxy-4,6-pregnadiene-3,20-dione,
6-methoxy-16-ethylidene-17α-hydroxy-4,6-pregnadiene-3,20-dione, and
1α,2α-cyclomethylene-6-methoxy-16-methylene-17α-hydroxy-4,6-pregnadiene-3,20-dione.

The 17α-hydroxy intermediates of Formula II are easily converted to the corresponding 17α-lower alkanoates of Formula I having anti-androgenic activity when treated according to known methods for esterifying tertiary alcohols. Thus, for example, 6-methoxy-16-methylene-17α-hydroxy-4,6-pregnadiene-3,20-dione upon treatment with acetic acid in the presence of p-toluenesulfonic acid and trifluoroacetic anhydride yields 6-methoxy-16-methylene-17α-acetoxy-4,6-pregnadiene-3,20-dione.

The 1-dehydro compounds defined by Formula II are also valuable as intermediates in the third process aspect of this invention whereby are prepared pharmacologically active 1α,2α-cyclomethylene derivatives of the 6-lower alkoxy-16-lower alkylidene-17α-lower alkanoyl-6-dehydroprogesterones defined by Formula I hereinabove.

The compounds of Formula II are derived from known 16-lower alkylidene-17α-hydroxyprogesterones via the first process aspect of this invention or from the corresponding 17α-lower alkanoates via alkaline hydrolysis.

Third composition of matter aspect

The invention sought to be patented in the third composition-of-matter aspect includes 6-keto-16-lower alkylidene 17α-lower alkanoylprogesterones as defined by Formula III.

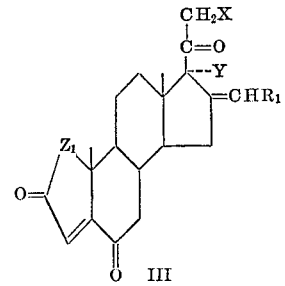

III wherein $R_1$ is a member selected from the group consisting of hydrogen and lower alkyl; X is a member selected from the group consisting of hydrogen, fluorine, and chlorine; Y is lower alkanoyl; and $Z_1$ is a member selected from the group consisting of —$CH_2$—$CH_2$—, —CH=CH—, and

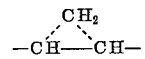

The compounds of Formula III are useful mainly as intermediates in the second process aspect of our invention whereby are prepared therapeutically valuable 6-alkoxy-16-alkylidene-17α-lower alkanoyloxy - 6 - dehydroprogesterones of Formula I, particularly those species wherein the 6-alkoxy group has at least two carbon atoms. The 6-keto compounds of Formula III are derived from the 6-methoxy compounds of Formula I by treatment with p-toluenesulfonic acid and acetic acid.

GENERAL DESCRIPTION OF THE PROCESS
ASPECTS OF THIS INVENTION

First process aspect

By the first process aspect of this invention are prepared 6-methoxy-pregnanes of the first and second product aspects of this invention, i.e. compounds having the following structural Formula IV:

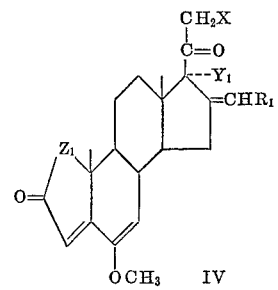

IV wherein $R_1$ is a member selected from the group consisting of hydrogen and lower alkanoyl; X is a member selected from the group consisting of hydrogen, fluorine and chlorine; $Y_1$ is a member selected from the group consisting of hydroxy and lower alkanoyloxy; and $Z_1$ is a member selected from the group consisting of —$CH_2$—$CH_2$—, —CH=CH—, and

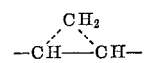

which comprises treatment of a member selected from the group consisting of 16-alkylidene progesterones of the following Formula V and the 3-enol ethers and the 3-enol esters thereof of Formula VI:

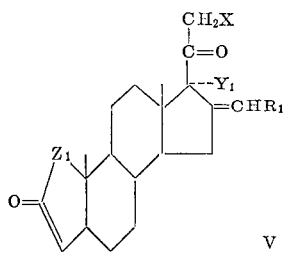

V

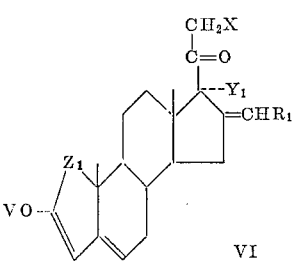

VI wherein $R_1$, X, $Y_1$ and $Z_1$ are as hereinabove defined and V is a member selected from the group consisting of lower alkyl and lower alkanoyl, with a reagent selected from the group consisting of cupric chloride and cupric bromide in methanol.

In carrying out the physical embodiment of our process whereby 6-unsubstituted-16-alkylidene-17α-oxygenated progesterones or the 3-enol ethers or 3-enol esters thereof are converted to the corresponding 6-methoxy-16-alkylidene-17α-oxygenated-6-dehydro progesterones, it is preferable to use anhydrous methanol which can serve as solvent and/or diluent as well as reagent. For optimum results, about four moles of the cupric halide reagent is required per mole of 16-alkylidene-progesterone starting steroid or of the enol-ether or enol-ester thereof. Usually, from about 4 to about 4.4 moles of cupric chloride or cupric bromide may be used per mole of starting steroid; we have found that maximum yields are obtained when 4 moles of the cupric halide is used per mole of starting steroid.

Our process may be carried out at temperatures in the range of from about 5° C. up to about the reflux temperature of methanol (i.e. about 65° C.), preferably at methanol reflux temperature. The reaction time is dependent upon the temperature at which our process is carried out. When our process is run at about 65° C., the reaction is usually completed within a period from one-half hour to about one and a half hours. When carrying out our process at 5° C., it will be several days before complete conversion of the 6-unsubstituted progesterone to a 6-methoxy-6-dehydroprogesterone is effected.

The 6-methoxy - 16 - alkylidene-17α-hydroxy (or alkanoyloxy)-6-dehydroprogesterone product of this process is isolated and purified by utilizing known procedures including solvent extraction, filtration, crystallization, chromatographic techniques, and the like.

In a preferred mode of the physical embodiment of this aspect of our invention, 16-methylene-17α-acetoxy-4-pregnene-3,20-dione (i.e. 16-methylene-17α-acetoxyprogesterone) suspended in methanol is reacted with about 4 moles of cupric chloride hydrate for about one hour at reflux temperature (i.e. at about 65° C.). After filtering the reaction mixture, the resulting product is isolated by adding the reaction mixture (after being concentrated to about a fourth of its original volume) to saturated aqueous ammonium chloride, then filtering the resulting precipitate of 6-methoxy-16-methylene-17α-acetoxy-6-dehydroprogesterone. Purification is usually effected by recrystallization.

Advantageously, our process may also utilize as starting compounds either enol ether or enol ester derivatives of 16-alkylidene-17α-hydroxy (or alkanoyloxy) progesterones. When these enol derivatives are utilized as starting compounds, our process is carried out in the same manner as when utilizing a 3-keto starting steroid and there will be isolated the desired 6-methoxy-6-dehydroprogesterone.

The 16-alkylidene-17α-hydroxy (or alkanoyloxy) progesterone starting compounds of this process aspect are either known in the art or can be prepared by known methods. The starting 16-alkylidene-progesterones of Formula IV wherein Z is —$CH_2$—$CH_2$— or —CH=CH— are described in, or prepared by, processes described in U.S. Pat. No. 3,312,692. The compounds of Formula IV wherein Z is

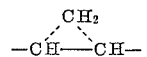

are known; if unavailable, they can be prepared from the 1-dehydro compounds of Formula IV by treatment with dimethylsulfoxonium methylide prepared from trimethylsulfoxonium iodide and sodium hydride in dimethylsulfoxide in a manner similar to that described hereinbelow. process aspect of our invention described hereinbelow.

The 3-enol ether and 3-enol ester starting derivatives are prepared from the corresponding progesterone utilizing known methods. Thus, the ethyl enol ether of 16-methylene - 17α - acetoxyprogesterone (i.e. 3-ethoxy-16-methylene-17α-acetoxy - 3,5 - pregnadien-20-one) is prepared by reaction of the progesterone with ethyl-o-formate, concentrated sulfuric acid, anhydrous ethanol and dioxane. Similarly, the 3-acetoxy enol ester of 16-methylene - 17α - acetoxyprogesterone (i.e., 3,17α-diacetoxy-16-methylene-3,5-pregnadien-20-one) is prepared by reaction of the progesterone with sulfosalicylic acid and acetic anhydride in toluene.

Second process aspect

The second process aspect of our invention resides in the concept of treating a 6-keto-16-alkylidene-17α-oxygenated progesterone of structural Formula III (described hereinabove) with boron trifluoride in a lower alkanol whereby is prepared a 6-alkoxy-16-alkylidene-17α-lower alkanoyloxy-6-dehydroprogesterone of the following structural Formula VII:

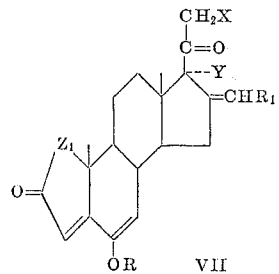

VII wherein R is a lower alkyl, $R_1$ is a member selected from the group consisting of hydrogen and lower alkanoyl; X is a member selected from the group consisting of hydrogen, fluorine and chlorine; Y is lower alkanoyloxy; and $Z_1$ is a member selected from the group consisting of —$CH_2$—$CH_2$—, —CH=CH—, and

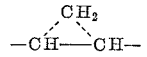

Conversion of a 6-keto-16-alkylideneprogesterone, III, to a 6-alkoxy-16-alkylidene-17α-lower alkanoyl-6-dehydroprogesterone, VII, is effected by treating the 6-ketoprogesterone with an excess of boron trifluoride in a lower alkanol at room temperature for about 48 hours to obtain a 6-alkoxy derivative corresponding to the alkanol used in the process, e.g. when ethanol is the solvent used, a 6-ethoxy-6-dehydroprogesterone of Formula VII is formed; and when isopropanol is the alcohol used, a 6-isopropoxy-6-dehydroprogesterone is formed. The resultant 6-alkoxy derivative of Formula VII is easily isolated by adding the reaction mixture to aqueous sodium bicarbonate solution and filtering the resultant precipitate. Purification can be effected by known methods, including recrystallization, chromatography and the like.

A convenient method of preparing the necessary 6-keto starting compounds of Formula III, is by converting a 6-methoxy compound of Formula IV (prepared by the first process aspect of our invention) via acid catalyzed hydrolysis employing mineral acids or, preferably, by treatment with p-toluenesulfonic acid in 80% acetic acid. Usually to prepare a 6-keto compound of Formula III from a 6-methoxy-derivative of Formula IV, to 6-methoxy-16-alkylidene-6-dehydroprogesterone of Formula IV there is added p-toluenesulfonic acid in 80% acetic acid and the reaction is carried out at reflux temperature for about one hour. Isolation and purification of the resulting 6-keto-16-alkylidene product is conveniently effected by adding water to the reaction mixture, filtering the resultant precipitate, and purifying via precipitation or chromatographic techniques.

The second process aspect of our invention thus provides a method of converting the 6-methoxy-16-alkylidene-6-dehydroprogesterones of our invention to higher 6-alkoxy homologs thereof. A preferred species of the second process aspect of this invention is the preparation of 6 - ethoxy-16-methylene-17α-acetoxy-4,6-pregnadiene-3,20-dione from 6 - keto - 16 - methylene-17α-acetoxy-4-pregnene-3,20-dione derived from 6-methoxy-16-methylene-17α-acetoxy-4,6-pregnadiene-3,20-dione as specifically described in Example 9 herein.

Third process aspect

A preferred method of preparing the 1α,2α-cyclomethylene compounds of our invention, i.e. those compounds of Formulae I and II wherein Z or $Z_1$ is

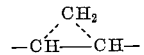

having the following Formula VIII:

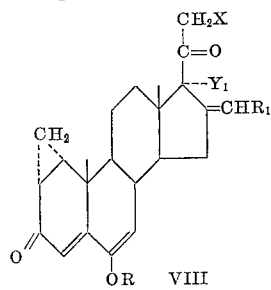

wherein R is lower alkyl; $R_1$ is a member selected from the group consisting of hydrogen and lower alkyl; X is a member selected from the group consisting of hydrogen, chlorine and fluorine; and $Y_1$ is a member selected from the group consisting of hydroxy and lower alkanoyloxy; comprises treating a 1-dehydro compound of our invention (i.e. those compounds of Formula II wherein $Z_1$ is —CH=CH—) of the following Formula IX:

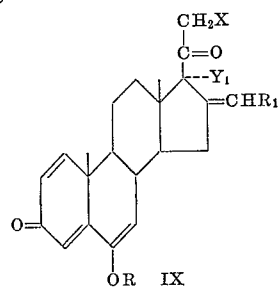

wherein R, $R_1$, X and $Y_1$ are as defined hereinabove for Formula VIII; with about a molar equivalent of dimethylsulfoxonium methylide prepared from two molar equivalents of trimethylsulfoxonium iodide and about one molar equivalent of sodium hydride per mole steroid in dimethylsulfoxide.

The physical embodiment of this aspect of our invention is usually carried out under an inert atmosphere, e.g. argon gas, at room temperature, e.g. in the temperature range of about 10° C. to about 25° C., for a period of about 20 to 24 hours.

A preferred species of this process aspect of our invention is the preparation of 1α,2α-cyclomethylene-6-methoxy-16-methylene-17α-acetoxy-4,6-pregnadiene-3,20-dione (i.e. a compound of Formulae I and VIII wherein R is methyl, X and $R_1$ are hydrogen and Y and $Y_1$ are acetoxy) from 6-methoxy-16-methylene-17α-hydroxy-1,4,6-pregnatriene-3,20-dione (a compound of Formula IX wherein R is methyl, $R_1$ and X are hydrogen, and $Y_1$ is hydroxy) by treatment with dimethylsulfoxonium methylide prepared by reaction of trimethylsulfoxonium iodide and sodium hydride under an atmosphere of argon as specifically described in Example 7A followed by acetylation at C-17 according to known procedures, e.g. as described in Example 7B.

The 6-alkoxy-16-alkylidene-17α-hydroxy-1,4,6-pregnatriene-3,20-dione intermediates are conveniently prepared basic hydrolysis of the corresponding 17α-lower alkanoate ester derivatives which in turn are prepared from the corresponding 1,2-dihydroprogesterones of our invention (i.e. those compounds wherein Z or $Z_1$ is —$CH_2$—$CH_2$—) by known chemical dehydrogenating methods, e.g. those utilizing 2,3-dichloro-5,6-dicyanobenzoquinone in benzene or selenium dioxide in tert.-butyl alcohol, or by employing microbiological techniques such as by the action of *Bacillus sphaericus* or *Corynebacterium simplex*. For example, 6 - methoxy-16-methylene-17α-acetoxy-4,6-pregnadiene-3,20-dione (a compound of Formula I wherein Z is —$CH_2$—$CH_2$—) upon treatment with 2,3-dichloro-5,6-dicyanobenzoquinone yields the intermediate 6-methoxy-16 - methylene-17α-acetoxy-1,4,6-pregnatriene-3,20-dione which upon alkaline hydrolysis yields 6-methoxy-16-methylene-17α-hydroxy-1,4,6-pregnatriene-3,20-dione.

The following experiments illustrate in detail some of the compounds and processes for their preparation which constitute this invention. This invention is not to be construed as limited in scope thereby since it will be apparent to those skilled in the art that many modifications in materials and methods may be made without departing from the invention.

EXAMPLE 1

6-methoxy-16-methylene-17α-hydroxy-4,6-pregnadiene-3,20-dione

To a solution of 16-methylene-17α-hydroxy-4-pregnene-3,20-dione (34.2 g.) in methanol (1.7 liters) heated to reflux temperature add 68.2 g. of cupric chloride hydrate $CuCl_2 \cdot 2H_2O$) and reflux and reaction mixture for one hour. Cool the reaction mixture, filter and then concentrate the filtered reaction solution in vacuo to a volume of about 300 ml. and pour the foregoing concentrate into 3 liters of saturated aqueous ammonium chloride. A precipitate comprising 6-methoxy-16-methylene-17α-hydroxy-4,6-pregnadiene-3,20-dione separates. Isolate the precipitate by filtration, wash with water and partially dry by suction on the filter.

Purify by dissolving the 6-methoxy-16-methylene-17α-hydroxy-4,6-pregnadiene-3,20-dione in 680 ml. of methanol and stir for 15 minutes with 34 g. of zinc dust. Remove the zinc by filtration and boil the filtrate with 17 g. of Darco G-60. Filter the darco and add 400 ml. of water slowly. Cool the mixture to 5° C. and allow it to stand overnight. Filter the crystalline precipitate, wash with cold 50% methanol and dry to give 19 g. of 6-methoxy-16-methylene - 17α - hydroxy - 4,6 - pregnadiene-3,20-dione. M.P. 176–179° C.; [α]$_D$ —61–6° (dioxane);

$\lambda_{max.}^{MeOH}$ 246; 302 mμ (εm 8050; 10700)

NMR: δ (p.p.m.) TMS=0; 0.89 ($C_{18}$–$CH_3$); 1.12 ($C_{19}$–$CH_3$); 2.32 ($C_{21}$–$CH_3$); 3.60 ($C_6$–$OCH_3$); 5.11 ($C_7H$); 5.11 and 5.31 ($C_{16}$=$CH_2$); 6.27 ($C_4$—H).

EXAMPLE 2

6-methoxy-16-methylene-17α-acetoxy-4,6-pregnadiene-3,20-dione

To a stirred suspension of 16-methylene-17α-acetoxy-4-pregnene-3,20-dione (57.67 g.) in 2.88 liters of methanol at reflux temperature add 102.29 g. of cupric chloride hydrate ($CuCl_2 \cdot 2H_2O$) reflux the reaction mixture with stirring for one hour, cool then filter and concentrate the filtrate in vacuo to a volume of about 600 ml. Pour the foregoing concentrate into 6 liters of saturated aqueous ammonium chloride and remove the resultant precipitate by filtration, wash with water and dry to yield 57 g. of product comprising 6-methoxy-16-methylene-17α-acetoxy-4,6-pregnadiene-3,20-dione.

Purify by dissolving the product in 90 ml. of methanol and stirring for 5 minutes with 29 g. of zinc dust. Remove the zinc by filtration and treat the filtrate (hot) with darco, filter the darco and concentrate the filtrate to a volume of about 1.1 liters. Slowly add 80 ml. of water and allow the mixture to stand several hours at room temperature and then overnight at 5° C. Collect the resultant crystalline solid by filtration, wash with cold 50% aqueous methanol and dry at 70° C. Recrystallize from aqueous acetone (darco treated) to give 3.5 g. of 6-methoxy-16-methylene-17α-acetoxy - 4,6 - pregnadiene - 3,20-dione. M.P. 155–159° C.; $[\alpha]_D$ —153.9° (dioxane); $\lambda_{max.}^{MeOH}$ 248; 303 mμ (εm 8350; 14400)

NMR: δ (p.p.m.) TMS=0; 0.81 ($C_{18}$–$CH_3$); 1.15 ($C_{19}$–$CH_3$), 2.05 ($C_{17}$–$OCOCH_3$); 2.15 ($C_{21}$–$CH_3$); 3.62 ($C_6$—$OCH_3$); 5.12 ($C_7$—H); 5.52 and 5.65 ($C_{16}$=$CH_2$); 6.32 ($C_4$—H).

In similar manner, 16-methylene-17α-hydroxy-4-pregnene-3,20-dione 17-caproate (16-methylene-17α-caprooxy-4-pregnene-3,20-dione) in methanol is treated with cupric chloride hydrate ($CuCl_2 \cdot 2H_2O$) and the resultant product isolated and purified as described hereinabove to obtain 6-methoxy - 16 - methylene-17α-caprooxy-4,6-pregnadiene-3,20-dione.

EXAMPLE 3

Alternate process for the preparation of 6-methoxy-16-methylene-17α-acetoxy - 4,6 - pregnadiene-3,20-dione (via the enol ether)

The requisite starting compound, i.e. 3-ethoxy-16-methylene-17α-acetoxy - 3,5 - pregnadien-20-one is prepared according to known procedures from 16-methylene-17α-acetoxy-4-pregnene-3,20-dione utilizing ethyl-o-formate, concentrated sulfuric acid, anhydrous ethanol and dioxane.

To 10 ml. of methanol add 103 mg. of 3-ethoxy-16-methylene-17α-acetoxy-3,5-pregnadien-20-one and 171 mg. of cupric chloride hydrate ($CuCl_2 \cdot 2H_2O$). Reflux the reaction mixture for 1.5 hours, then distill the methanol in vacuo to a small volume. Pour the resultant slurry into water saturated with ammonium chloride. A precipitate comprising 6-methoxy-16-methylene - 17α - acetoxy-4,6-pregnadiene-3,20-dione separates. Filter, wash with water and dry, then purify by crystallization from aqueous methanol to give 62 mg. of 6-methoxy-16-methylene-17α-acetoxy-4,6-pregnadiene-3,20-dione.

EXAMPLE 4

Alternate procedure for the preparation of 6-methoxy-16-methylene-17α-acetoxy - 4,6 - pregnadiene-3,20-dione via the enol ether)

The requisite starting compound, i.e. 3,17α-diacetoxy-16-methylene-3,5-pregnadien-20-one is prepared according to known procedures from 16β-methyl-16α,17α-oxido-4-pregnene-3,20-dione by treatment with sulfosalicylic acid and acetic anhydride in toluene.

To 107 mg. of 3,17α-diacetoxy-16-methylene-3,5-pregnadien-20-one in 10 ml. of methanol add 171 mg. of cupric chloride hydrate ($CuCl_2 \cdot 2H_2O$), reflux the reaction mixture for 1.75 hours then distill most of the methanol in vacuo. Pour the resultant slurry into 20 ml. of saturated aqueous ammonium chloride and filter the resultant precipitate comprising 6-methoxy-16-methylene-17α-acetoxy-4,6-pregnadiene-3,20-dione. Wash with water and dry. Yield=82 mg.

EXAMPLE 5

6-methoxy-16-methylene-17α-hydroxy-1,4,6-pregnatriene-3,20-dione (A) To 296 ml. of benzene add 7.4 g. of 6-methoxy-16-methylene-17α-hydroxy - 4,6 - pregnadiene-3,20-dione and 7.94 g. of 2,3-dichloro-5,6-dicyanobenzoquinone. Reflux the solution for 24 hours, cool, filter and distill the benzene in vacuo to a concentrate of about 50 ml. Place the concentrate on a chromatographic column packed with 350 g. of Florisil washed in hexane. Elute the column successively using hexane, ether, then ether containing increasing amounts of methylene chloride. Collect the eluates from the 10–30% methylene chloride in ether mixtures and evaporate the combined eluates to a residue. Crystallize the residue from ether to give 581 mg. of 6-methoxy-16-methylene-17α-hydroxy-1,4,6-pregnatriene-3,20-dione.

$\lambda_{max.}^{MeOH}$ 235; 317 mμ (εm 13,900; 6,400)

nmr: δ (p.p.m.) TMS=O; 0.90 ($C_{18}$–$CH_3$); 1.22 ($C_{19}$–$CH_3$); 2.32 ($C_{21}$–$CH_3$); 3.62 ($C_6$—$OCH_3$); 4.98 ($C_7$H); 5.12 and 5.32 ($C_{16}$=$CH_2$); 6.25 ($C_2$—H); 6.53 ($C_4$—H); 7.08 ($C_1$—H).

(B) The compound of this example is also prepared as follows.

To a solution of 4.1 g. of 6-methoxy-16-methylene-17α-acetoxy-1,6-bisdehydroprogesterone (prepared as described in Example 6A) in 100 ml. of methyl alcohol add 5.25 ml. of 2-normal aqueous sodium hydroxide. Stir under an argon atmosphere at room temperature for 18 hours. Dilute the reaction mixture with 50 ml. of water then neutralize with acetic acid. Concentrate in vacuo to a crystalline slurry. Filter the crystalline solid, wash with water, and dry to give 3.7 g. of 6-methoxy-16-methylene-17α-hydroxy-1,4,6-pregnatriene-3,20-dione.

EXAMPLE 6

6-methoxy-16-methylene-17α-acetoxy-1,4,6-pregnatriene-3,20-dione (A) Add 1.24 g. of 6-methoxy-16-methylene-17α-acetoxy-4,6-pregnadiene - 3,20 - dione and 1.02 g. of 3,2-dichloro-5,6-dicyanobenzoquinone to 49 ml. of benzene. Reflux for 24 hours, cool, filter, and distill the benzene in vacuo to a concentrate of a small volume. Pour the concentrate on to a chromatographic column containing 36 g. of hexane-washed Forisil. Elute the column using benzene followed by benzene containing increasing amounts of methylene chloride. Combine the eluates obtained from 20% to 75% mixtures of methylene chloride in benzene and evaporate to a residue. Crystalize the residue from aqueous methanol (darco treated) to give 550 mg. of 6-methoxy-16-methylene - 17α - acetoxy-1,4,6-pregnatriene-3,20 dione; M.P. 120–124° C.; $[\alpha]_D$ —204.3° (dioxane);

$\lambda_{max.}^{MeOH}$ 235; 315 mμ (εm 16,000; 9,375)

nmr: δ (p.p.m.) TMS=O; 0.81 ($C_{18}$–$CH_3$); 1.21 ($C_{19}$–$CH_3$); 2.02 ($C_{17}$—$OCOCH_3$); 2.16 ($C_{21}$—$CH_3$); 3.64 ($C_6$—$OCH_3$); 4.96 ($C_7$—H ); 5.49 and 5.60 ($C_{16}$=$CH_2$); 6.26 $C_2$—H); 6.53 ($C_4$—H); 7.06 ($C_1$—H).

In similar manner treat 6-methoxy-16-methylene-17α-caprooxy-4,6-pregnadiene-3,20-dione with 2,3-dichloro-5,6-dicyanobenzoquinone in benzene and isolate the resultant product in a manner similar to that described above to obtain 6-methoxy-16-methylene - 17α - caprooxy-1,4,6-pregnatriene-3,20-dione.

(B) Alternatively the compound of this example is prepared as follows. To a solution of 2.1 g. of 6-methoxy-16-methylene-17α-hydroxy - 1,4,6 - pregnatriene-3,20-dione and 220 mg. of p-toluenesulfonic acid in 11 ml. of acetic acid cooled to 10° C. and under an argon atmosphere add dropwise over a 10 minute period 4.4 ml. of trifluoroacetic anhydride. Stir the mixture for one hour at room temperature then pour into water and separate by filtration the resultant product comprising 6-methoxy-16-methylene-17α-acetoxy - 1,4,6 - pregnatriene-3,20-dione then wash with water and dry.

Purify by crystallization from aqueous methanol to give 6-methoxy-16-methylene - 17α - acetoxy-1,4,6-pregnatriene-3,20-dione.

In similar manner, by substituting for acetic acid other lower alkanoic acids such as butyric acid and valeric acid, there is obtained the corresponding 17-lower alkanoate derivative, e.g. 6-methoxy-16-methylene-17α-butyroxy-1,4, 6-pregnatriene-3,20-dione, respectively.

EXAMPLE 7

1α,2α-cyclomethylene-6-methoxy-16-methylene-17α-acetoxy-4,6-pregnadiene-3,20-dione (A) 1α,2α-cyclomethylene-6-methoxy - 16 - methylene-17α-hydroxy-4,6-pregnadiene-3,20-dione: Add 1.32 g. of trimethylsulfoxonium iodide and 144 mg. of sodium hydried (50% dispersion in oil) to 21 ml. of dimethylsulfoxide and stir under an argon atmosphere for 2 hours at room temperature then add 1.104 g. of 6-methoxy-16-methylene-17α-hydroxy-1,4,6-pregnatriene-3,20-dione and continue stirring for 18 hours. Pour the reaction mixture into water, acidify with hydrochloric acid, filter the resultant precipitate comprising 1α,2α-cyclomethylene-6-methoxy - 16 - methylene-17α-hydroxy-4,6-pregnadiene-3, 20-dione, wash with water and dry. Yield=1.06 g.

Purify by crystallization from acetone-hexane to give 1α,2α-cyclomethylene-6-methoxy - 16 - methylene - 17α-hydroxy-4,6-pregnadiene-3,20-dione. M.P. 224–227° C; [α]$_D$97.5° (dioxane);

$\lambda_{max.}^{MeOH}$ 242 and 302 mμ (em 8,250 and 12,400)

nmr: δ (p.p.m.) TMS=0; 0.090 ($C_{18}$–$CH_3$); 1.21 ($C_{19}$–$CH_3$); 2.32 ($C_{21}$–$CH_3$); 3.58 ($C_6$–$OCH_3$); 5.00 ($C_7$—H); 5.12 and 5.32 ($C_{16}$=$CH_3$); 6.12 ($C_4$—H).

(B) 1α,2α-cyclomethylene-6-methoxy - 16 - methylene-17α-acetoxy-4,6-pregnadiene-3,20-dione: To a solution of 2.2 g. of 1α,2α cyclomethylene-6-methoxy-16-methylene-17α-hydroxy-4,6-pregnadiene-3,20-dione and 220 mg. of p-toluenesulfonic acid in 11 ml. of acetic acid under an argon atmosphere and at 10° C. and dropwise over a 10 minute period 4.4 ml. of trifluoroacetic anhydride. Stir the mixture for one hour at room temperature then pour into water. A precipitate forms comprising 1α,2α-cyclomethylene-6-methoxy-16-methylene - 17α - acetoxy-4,6-pregnadiene-3,20-dione. Separate by filtration, wash with water then dry.

Purify the chromatographing on a column containing 30 g. of hexane-washed Florisil. Elute the column using hexane followed by hexane with increasing amounts of ether. Combine the eluates from 25%–50% ether-hexane mixtures. Evaporate the combined eluates to dryness and recrystallize the resultant residue from aqueous methanol to give 707 mg. of 1α,2α-cyclomethylene-6-methoxy-16-methylene-17α-acetoxy-4,6-pregnadiene-3,20-dione; M.P. 196–200° C.; [α]−8.6° (dioxane):

$\lambda_{max.}^{MeOH}$ 240; 301 mμ (em 8,400; 12,900)

nmr: δ (p.p.m.) TMS=0; 0.81 ($C_{18}$–$CH_3$); 12.2 ($C_{19}$–$CH_3$); 2.07 (C–17 acetate); 2.17 ($C_{21}$–$CH_3$); 3.60 ($C_6$—$OCH_3$); 5.02 (C—7H); 5.51 and 5.62 ($C_{16}$=$CH_2$); 6.13 ($C_4$—H).

In the above procedure, by substituting for acetic acid other lower alkanoic acids such as propionic, caproic, and valeric acids, there is obtained the corresponding 17-lower alkanoate ester, namely 1α,2α-cyclomethylene-6-methoxy-16-methylene-17α-propionoxy - 4,6 - pregnadiene-3,20-dione, 1α,2α-cyclomethylene - 6 - methoxy - 16-methylene-17α-caprooxy-4,6-pregnadiene-3,20-dione and 1α,2α-cyclomethylene-6-methoxy-16-methylene - 17α - valeroxy-4,6-pregnadiene-3,20-dione.

(C) Alternatively the compounds of Example 7B, is also prepared by treating 6-methoxy-16-methylene-17α-acetoxy-1,4,6-pregnatriene-3,20-dione with trimethylsulfoxonium iodide and sodium hydride in dimethylsulfoxide in the manner described in above procedure 7A. Isolate and purify the resultant product in a manner similar to that described to obtain 1α,2α-cyclomethylene-6-methoxy-16-methylene-17α-acetoxy-4,6-pregnadiene-3,20-dione.

EXAMPLE 8

6-methoxy-16-methylene-17α-propionoxy-4,6-pregnadiene-3,20-dione

In a manner similar to that described in Example 6B, treat 6-methoxy-16-methylene-17α-hydroxy-4,6-pregnadiene-3,20-dione with p-toluenesulfonic acid and propionic acid in the presence of trifluoroacetic anhydride. Isolate the resultant product in a manner similar to that described to give 6-methoxy-16-methylene-17α-propionoxy-4,6-pregnadiene-3,20-dione.

In a similar manner by substituting for propionic acid in the above procedure other lower alkanoic acids such as acetic acid, butyric acid and tertiary-butylacetic acid, there is obtained the corresponding 17-lower alkanoate ester derivative, namely 6-methoxy-16-methylene-17α-acetoxy-4,6-pregnadiene-3,20-dione, 6-methoxy-16-methylene-17α-butyroxy-4,6-pregnadiene-3,20-dione and 6-methoxy-16-methylene-17α-t-butylacetoxy - 4,6 - pregnadiene-3,20-dione.

EXAMPLE 9

6-ethoxy-16-methylene-17α-acetoxy-4,6-pregnadiene-3,20-dione (A) 6-keto-16-methylene-17α-acetoxy-4-pregnene-3,20-dione: Add 6 g. of 6-methoxy-16-methylene-17α-acetoxy-4,6-pregnadiene-3,20-dione and 150 mg. of p-toluenesulfonic acid to 60 ml. of 80% aqueous acetic acid. Heat the reaction mixture at reflux temperature for one hour then add slowly 150 ml. of water. Set aside the reaction mixture at room temperature to crystallize, then chill to 5° C. for several hours. Filter the resultant precipitate comprising 6-keto-16-methylene-17α-acetoxy-4-pregnene-3,20-dione, wash with water then dry in vacuo. Yield=3.06 g. Purify by recrystallization from aqueous methanol to give 1.6 g. of 6-keto-16-methylene-17α-acetoxy-4-pregnene-3,20-dione; M.P. 206–210° C.; [α]$_D$−151.0° (dioxane);

$\lambda_{max.}^{MeOH}$ 250 mμ (em 10,300)

Similarly treat each of the following with p-toluenesulfonic acid in aqueous acetic acid in the manner described above:

6-methoxy-16-methylene-17α-valeroxy-4,6-pregnadiene-3,20-dione,
6-methoxy-16-methylene-17α-caprooxy-4,6-pregnadiene-3,20-dione,
6-methoxy-16-methylene-17α-acetoxy-1,4,6-pregnatriene-3,20-dione, and
1α,2α-cyclomethylene-6-methoxy-16-methylene-17α-acetoxy-4,6-pregnadiene-3,20-dione.

Isolate and purify the resultant products in a manner similar to that described hereinabove to give respectively 6-keto-16-methylene-17α-valeroxy-4-pregnene-3,20-dione,
6-keto-16-methylene-17α-caprooxy-4-pregnene-3,20-dione,
6-keto-16-methylene-17α-acetoxy-1,4-pregnadiene-3,20-dione and
1α,2α-cyclomethylene-6-keto-16-methylene-17α-acetoxy-4-pregnene-3,20-dione.

(B) Stir together for 48 hours a solution of 1 g. of 6-keto-16-methylene-4-pregnene-3,20-dione in 30 ml. of ethyl alcohol and 1.5 ml. of boron trifluoride etherate. Pour the reaction mixture into aqueous sodium bicarbonate solution and collect the resultant precipitate by filtration, wash with water and dry to give 903 mg. of 6-ethoxy-16-methylene-17α-acetoxy-4,6 - pregnadiene - 3,20 dione [α]$_D$ —106.9° dioxane. nmr: δ (p.p.m.) TMS=O; 0.80 (C$_{18}$–CH$_3$); 1.15 (C$_{19}$–CH$_3$); 1.32 (C$_6$—OCH$_2$C$\underline{H}_3$); 2.15 (C$_{21}$–CH$_3$); 3.78

(C$_6$—OC$\underline{H}_2$CH$_3$)

5.09 (C$_7$—H); 5.48 and 5.61 (C$_{16}$=CH$_2$); 6.35 (C$_4$—H);

$\lambda^{MeOH}_{max.}$ 248; 303 mμ (εm 8,750; 11,500)

Similarly treat each of the following 6-keto compounds with boron trifluoride in ethanol in the manner described hereinabove.

6-keto-16-methylene-17α-valeroxy-4-pregnene-3,20-dione,
6-keto-16-methylene-17α-caprooxy-4-pregnene-3,20-dione,
6-keto-16-methylene-17α-acetoxy-1,4-pregnadiene-3,20-dione, and
1α,2α-cyclomethylene-6-keto-16-methylene-17α-acetoxy-4-pregnene-3,20-dione.

Isolate and purify the resultant products in the manner described hereinabove in Example 9B to give, respectively 6-ethoxy-16-methylene-17α-valeroxy-4,6-pregnatriene-3,20-dione,
6-ethoxy-16-methylene-17α-caprooxy-4,6-pregnatriene-3,20-dione,
6-ethoxy-16-methylene-17α-acetoxy-1,4,6-pregnatriene-3,20-dione, and
1α,2α-cyclomethylene-6-ethoxy-16-methylene-17α-acetoxy-4,6-pregnadiene-3,20-dione.

EXAMPLE 10

16-butylidene-17α-acetoxy-4-pregnene-3,20-dione and 16-ethylidene-17α-acetoxy-4-pregnene-3,20-dione (A) 16α-n-butyl - 5 - pregnen-3β-ol-20-one 3-acetate and 16α-ethyl - 5 - pregnen-3β-ol-20-one 3-acetate: To a Grignard reagent prepared from 10.5 g. of butyl iodide and 1.8 g. of magnesium in 40 ml. of ether and containing 20 mg. of cupric chloride add a solution of 3.6 g. of 5,16-pregnadien-3β-ol-20-one 3-acetate in 20 ml. of dry toluene. Distill the reaction mixture until a vapor temperature of 100° C. is reached, then stop the distillation and maintain the reaction temperature at 100° C. for 5 hours. Cool the mixture, pour onto ice and an aqueous solution of ammonium chloride and separate the resultant solvent layers. Distill the organic layer in vacuo to a residue, chromatograph on Florisil with hexane. Elute the column with hexane followed by increasing amounts of ether-in-hexane. Combine the eluates ranging from 15% ether-in-hexane and evaporate to a residue. Re-esterify this residue by dissolving in 20 ml. of dry pyridine and 3 ml. of acetic anhydride and allow to stand at room temperature for 5 hours. Add water, filter the resultant precipitate and crystallize the precipitate from acetone-hexane to give 16α-n-butyl-5-pregnen-3β-ol-20-one 3-acetate.

In a similar manner treat 5,16-pregnadien-3β-ol-20-one 3-acetate with ethyl magnesium iodide and isolate the resultant product and re-esterify this product with acetic anhydride in pyridine to give 16α-ethyl-5-pregnen-3β-ol-20-one 3-acetate.

(B) 16α-n-butyl-17α-bromo-5-pregnen-3β-ol-20-one 3-acetate and 16α-ethyl-17α-bromo-5-pregnen-3β-ol-20-one 3-acetate: To 1 g. of 16α-n-butyl-5-pregnen-3β-ol-20-one 3-acetate in 10 ml. of acetic acid add 2.1 molar equivalents of bromine in acetic acid. When the bromine color disappears add 0.5 g. of sodium iodide in 3 ml. of water. Warm the solution at 30° C. for 20 minutes, cool and then dilute with water. Filter the resultant precipitate, wash with water, dry and crystallize from aqueous acetone to give 16α-n-butyl-17α-bromo-5-pregnen-3β-ol-20-one 3-acetate.

In similar manner treat 16α-ethyl-5-pregnen-3β-ol-20-one 3-acetate with 2.1 equivalents of bromine in acetic acid followed by treatment of the resultant product with 0.5 g. of sodium iodide, then isolation and purification of the final product in a manner similar to that described, to give 16α-ethyl-17α-bromo-5-pregnene-3β-ol-20-one 3-acetate.

(C) 16-n-butyl-5,16-pregnadien-3β-ol-20-one 3-acetate and 16-ethyl-5,16-pregnadien-3β-ol-20-one 3-acetate: Add 1 g. of 16α-n-butyl-17α-bromo-5-pregnene-3β-ol-20-one 3-acetate to 20 ml. of dimethylformamide and heat the solution under a nitrogen atmosphere at reflux temperature for 3 hours. Cool the reaction mixture, then pour into ice water containing excess hydrochloric acid and extract with methylene chloride. Wash the combined methylene chloride extracts with water, then dry over magnesium sulfate and evaporate to a residue. Chromatograph this residue over Florisil eluting with hexane followed by increasing amounts of ether-in-hexane. Combine the eluates ranging from 10% ether-in-hexane to 30% ether-in-hexane and evaporate to a residue. Crystallize the residue from methylene chloride-hexane to give 16-n-butyl-5,16-pregnadien-3β-ol-20-one 3-acetate.

In a similar manner treat 16α-ethyl-17α-bromo-5-pregnen-3β-ol-20-one 3-acetate with dimethylformamide and isolate and purify the resultant product in a manner similar to that described to give 16-ethyl-5,16-pregnadien-3β-ol-20-one 3-acetate.

(D) 16β-n-butyl-16α,17α-oxido - 5 - pregnen-3β-ol-20-one and 16β-ethyl-16α,17α-oxido - 5 - pregnen-3β-ol-20-one: To a solution of 3 g. of 16-n-butyl-5,16-pregnadien-3β-ol-20-one 3-acetate in 95 ml. of methnol at approximately 15° C. add 3 ml. of 4-N-sodium hydroxide followed by 6 ml. of 30% hydrogen peroxide. Allow the mixture to remain at approximately 5° C. for 18 hours. Pour the reaction solution into 500 ml. of water and separate the resultant precipitate by filtration, then dry and crystallize from acetone-hexane to give 16β-n-butyl-16α,17α-oxido-5-pregnen-3β-ol-20-one.

(E) 16β-n-butyl-16α,17α-oxido-4-pregnene-3,20 - dione and 16β-ethyl-16α,17α-oxido-4-pregnene-3,20-dione: Dissolve 2.5 g. of 16β-n-butyl-16α,17α-oxido-5-pregnen-3β-ol-20-one in 172 ml. of toluene. Distill about 17 ml. of toluene then add 37.5 ml. of freshly distilled cyclohexanone followed by a solution of 1.25 g. of aluminum isopropoxide in dry toluene added dropwise over a five-minute period. Reflux the solution for one hour under a Dean Stark trap then add cautiously 60 ml. of water, then azeotrope off the water. Cool the solution, filter and steam distill the filtrate. Filter the suspension left away steam distillation and wash the solid residue with water, dry and crystallize from isopropyl ether to give 16β-n-butyl-16α,17α-oxido-4-pregnene-3,20-dione.

In a similar manner treat 16β-ethyl-16α,17α-oxido-5-pregnene-3,20-dione with aluminum isopropoxide in the presence of cyclohexanone to obtain 16β-ethyl-16α,17α-oxido-4-pregnene-3,20-dione.

(F) 16-n-butylidene-17α-hydroxy - 4 - pregnene-3,20-dione: Add 0.6 g. of 16β-n-butyl-16α,17α-oxido-4-pregnene-3,20-dione to 17 ml. of acetic acid, warm the solution to 35° C. then add 0.17 ml. of a 10% solution of hydrobromic acid in acetic acid. Maintain the reaction mixture at approximately 35–45° C. for 20 minutes, then dilute with 20 ml. of water. Separate the resultant precipitate by filtration and wash the residue with water, dry at 60° C. and crystallize from acetone to give 16-n-butylidene-17α-hydroxy-4-pregnene-3,20-dione.

(G) 16-n-butylidene-17α-acetoxy-4-pregnene-3,20-dione and 16-ethylidene-17α-acetoxy-4-pregnene-3,20-dione: In a manner similar to that described in Example 6B, treat each of 16-n-butylidene - 17α - hydroxy-4-pregnene-3,20-dione and 16-ethylidene-17α-hydroxy - 4 - pregnene-3,20-dione with a mixture of acetic acid, p-toluenesulfonic acid and trifluoroacetic anhydride. Isolate and purify the resultant respective products in a manner similar to that described to give 16-n-butylidene-17α-acetoxy-4-pregnene-3,20-dione and 16-ethylidene-17α-acetoxy - 4 - pregnene-3,20-dione, respectively.

In a similar manner in the above procedure if other lower alkanoic acids are substituted for acetic acid such as 17-propionic acid and 17-caproic acid, there are obtained the respective propionic acid esters, namely 16-n-butylidene-17α-propionoxy-4-pregnene-3,20-dione,
16-n-butylidene-17α-caprooxy-4-pregnene-3,20-dione,
16-ethylidene-17α-propionoxy-4-pregnene-3,20-dione, and
16-ethylidene-17α-caprooxy-4-pregnene-3,20-dione.

EXAMPLE 11

6 - methoxy-16-n-butylidene-17α-acetoxy-4,6-pregnadiene-3,20 - dione and 6-methoxy-16-ethylidene-17α-acetoxy-4,6-pregnadiene-3,20-dione (A) In a manner similar to that described in Example 2, treat each of 16-n-butylidene-17α-acetoxy-4-pregnene-3,20-dione and 16-ethylidene-17α-acetoxy-4-pregnene-3,20 dione with cupric chloride hydrate in methanol at reflux temperature. Isolate and purify each of the resultant products in a manner similar to that described in Example 2 to obtain 6-methyl-16-n-butylidene-17α-acetoxy-4,6-pregnadiene-3,20-dione and 6 - methoxy-16-ethylidene-17α-acetoxy-4,6-pregnadiene-3,20-dione, respectively.

Utilize as starting steroid instead of the 17-acetate derivative named therein the following derivatives 16-n-butylidene-17α-propionoxy-4-pregnene-3,20-dione,
16-n-butylidene-17α-caprooxy-4-pregnene-3,20-dione,
16-ethylidene-17α-propionoxy-4-pregnene-3,20-dione,
16-ethylidene-17α-caprooxy-4-pregnene-3,20-dione.

Isolate and purify the resultant respective products in a manner similar to that described to give respectively, 6-methoxy-16-n-butylidene-17α-propionoxy-4,6-pregnadiene-3,20-dione,
6-methoxy-16-n-butylidene-17α-caprooxy-4,6-pregnadiene-3,20-dione,
6-methoxy-16-ethylidene-17α-propionoxy-4,6-pregnadiene-3,20-dione,
6-methoxy-16-ethylidene-17α-caprooxy-4,6-pregnadiene-3,20-dione.

(B) Treat each of 16 - n - butylidene-17α-acetoxy-4-pregnene-3,20 - dione and 16-ethylidene-17α-acetoxy-4-pregnene-3,20 - dione with ethyl-o-formate, concentrated sulfuric acid and anhydrous ethanol and dioxane according to known procedures to obtain the following requisite starting compounds, i.e. 3 - ethoxy-16-n-butylidene-17α-acetoxy - 3,5 - pregnadien-20-one and 3-ethoxy-16-ethylidene-17α-acetoxy-3,5-pregnadien-20-one.

In a manner similar to that described in Example 3, treat each of the three ethoxy enol ether derivatives prepared in the foregoing paragraph with cupric chloride hydrate in methanol. Isolate and purify the resultant respective products in a manner similar to that described to obtain respectively 6 - methoxy-16-n-butylidene-17α-acetoxy-4,6-pregnadiene-3,20-dione and 6 - methoxy-16-ethylidene-17α-acetoxy-4,6-pregnadiene-3,20-dione.

(C) The requisite starting compounds, i.e. 3,17α-diacetoxy-16-n-butylidene-3,5-pregnadien-20-one and 3,17α-diacetoxy-16-ethylidene-3,5-pregnadien-20 - one are prepared according to known procedures from 16β-n-butyl-16α,17α - oxido-4-pregnene3,20-dione and 16β-ethyl-16α,17α-oxido-4-pregnene-3,20-dione by treatment with sulfosalicylic acid and acetic anhydride in toluene.

In a manner similar to that described in Example 4, treat each of the three acetoxy enol esters prepared in the foregoing paragraph with cupric chloride hydrate in methanol and isolate and purify the resultant products to obtain respectively, 6-methoxy-16-n-butylidene-17α-acetoxy-4,6-pregnadiene-3,20-dione and 16-methoxy-16-ethylidene-17α-acetoxy-4,6-pregnadiene-3,20-dione.

(D) In a manner similar to that described in Example 1 treat each of 16-n-butylidene-17α-hydroxy-4-pregnene-3,20-dione and 16 - ethylidene-17α-hydroxy-4-pregnene-3,20-dione with cupric chloride hydrate in methanol. Isolate and purify the resultant products in a manner similar to that described to obtain 6-methoxy-16-n-butylidene-17α-hydroxy-4,6-pregnadiene-3,20-dione and 6-methoxy-16-ethylidene - 17α - hydroxy-4,6-pregnadiene-3,20-dione, respectively.

In a manner similar to that described in Example 6B, treat each of 6-methoxy-16-n-butylidene-17α-hydroxy-4,6-pregnadiene-3,20 - dione and 6-methoxy-16-ethylidene-17α-hydroxy-4,6-pregnadiene-3,20-dione with acetic acid in the presence of p-toluenesulfonic acid and trifluoroacetic anhydride. Isolate and purify the resultant products in a manner similar to that described to yield 6-methoxy-16-n-butylidene-17α-acetoxy-4,6 - pregnadiene-3,20-dione and 6 - methoxy-16-ethylidene - 17α - acetoxy-4,6-pregnadiene-3,20-dione, respectively.

EXAMPLE 12

6-ethoxy-16-n-butylidene - 17α - acetoxy-4,6-pregnadiene-3,20-dione and 6-ethoxy-16-ethylidene-17α-acetoxy-4,6-pregnadiene-3,20-dione (A) 16 - n - butylidene-17α-acetoxy-4-pregnene-3,6,20-trione and 16 - ethylidene-17α-acetoxy-4-pregnene-3,6,20-trione: In a manner similar to that described in Example 9A, treat each of 6-methoxy-16-n-butylidene-17α-acetoxy-4,6-pregnadiene-3,20-dione and 6-methoxy-16-ethylidene-17α - acetoxy-4,6-pregnadiene-3,20-dione with p-toluenesulfonic acid in 80% aqueous acetic acid. Isolate and purify the resultant respective products in a manner similar to that described to obtain 16-n-butylidene-17α-acetoxy-4-pregnene-3,6,20-trione and 16-ethylidene-17α-acetoxy-4-pregnene-3,6,20-trione.

In the above described processes, by utilizing as starting compound the 17-caproate ester derivatives instead of the 17-acetate starting steroid, there are obtained the corresponding 6-keto-17-caproate products, i.e. 16-n- butylidene-17α-caprooxy-4-pregnene-3,6,20 - trione and 16-ethylidene-17α-caprooxy-4-pregnene-3,6,20-trione, respectively.

(B) 6-ethoxy-16-n-butylidene-17α-acetoxy - 4,6 - pregnadiene-3,20-dione and 6-ethoxy-16-ethylidene-17α-acetoxy-4,6-pregnadiene-3,20-dione: In a manner similar to that described in Example 9B treat each of 16-n-butylidene-17α-acetoxy-4-pregnene-3,6,20-trione and 16-ethylidene-17α-acetoxy-4-pregnene-3,6,20-trione with boron trifluoride etherate in ethyl alcohol. Isolate and purify the resultant respective products to give 6-ethoxy-16-n-butylidene-17α-acetoxy-4,6-pregnadiene-3,20 - dione and 6-ethoxy-16-ethylidene-17α-acetoxy - 4,6 - pregnadiene-3,20-dione.

By substituting the 17-caprooxy ester derivative in the above procedure in place of the 17-acetoxy derivative, there is obtained the corresponding 17-caproate product, i.e. 6 - ethoxy - 16-n-butylidene-17α-caprooxy-4,6-pregnadiene-3,20-dione and 6 - ethoxy-16-ethylidene-17α-caprooxy-4,6-pregnadiene-3,20-dione, respectively.

EXAMPLE 13

6 - propionoxy - 16 - methylene - 17α - acetoxy - 4,6-pregnadiene - 3,20 - dione and 6 - butyroxy - 16 - methylene-17α-acetoxy-4,6-pregnadine-3,20-dione In a manner similar to that described in Example 9B, treat 16 - methylene-17α-acetoxy-4-pregnene-3,6,20-trione with boron trifluoride etherate and propyl alcohol to obtain 6 - propionoxy - 16 - methylene - 17α - acetoxy - 4,6-pregnadiene-3,20-dione.

Similarly, in the manner described in Example 9B, treat 16 - methylene - 17α - acetoxy - 4 - pregnene - 3,6,20-trione with n-butyl alcohol and boron trifluoro etherate. Isolate and purify the resultant product in a manner similar to that described to obtain 6-butyroxy-16-methylene-17α-acetoxy-4,6-pregnadiene-3,20-dione.

EXAMPLE 14

16-methylene-17α-lower alkanoyloxy-21-cholor-4-pregnene-3,20-dione (A) 16β - methyl - 16α,17α - oxido - 21 - chloro - 4-pregnene-3,20-dione: To 0.5 g. of 16β-methyl-16α,17α- oxido-21-iodo-4-pregnene-3,20-dione dissolved in 100 ml. of acetonitrile containing 1 ml. of water add a 50% aqueous solution of 1.7 g. of silver chloride. Warm the mixture at 30–40° C. for four hours then filter and pour the filtrate into water. Filter the resultant solid comprising 16β-methyl - 16α,17α - oxido - 21 - chloro - 4 - pregnene-3,20-dione.

(B) 16 - methylene - 17α - lower alkanoyloxy - 21-chloro-4-pregnene-3,20-dione: Bubble argon gas through a solution of 1 g. of 16β-methyl-16α,17α-oxido-21-chloro-4-pregnene-3,20-dione in 10 ml. of acetic acid then under anhydrous conditions add 2 ml. of trifluoroacetic anhydride. Heat the solution at 80–95° C. for about an hour then pour into ice water and extract the resultant mixture with methylene chloride. Combine the organic extracts then in turn wash the organic extracts with 3% aqueous potassium carbonate and finally with water. Dry the methylene chloride solution over magnesium sulfate, filter and evaporate to a residue. Triturate the residue with acetone-isopropyl ether and filter the resultant solid to give 16-methylene-17α-acetoxy-21-chloro-4-pregnene-3,20-dione.

By carrying out the above procedure in other lower alkanoic acids, e.g. propionic acid and caproic acid instead of acetic acid, there is obtained the corresponding 17-propionate and 17-caproate, respectively, i.e. 16-methylene-17α-propionoxy - 21 - chloro - 4 - pregnene - 3,20-dione and 16 - methylene - 17α - caprooxy - 21 - chloro-4-pregnene-3,20-dione.

(C) Alternatively, the compounds of this example are prepared as follows: Treat 16-methylene-17α-hydroxy-21-iodo-4-pregnene-3,20-dione with silver chloride in moist acetonitrile in a manner similar to that described in Example 14A. Isolate and purify the resultant product in a similar manner to obtain 16-methylene-17α-hydroxy-21-chloro-4-pregnene-3,20-dione.

In a manner similar to that described in Example 6B treat 16 - methylene - 17α - hydroxy - 21 - chloro - 4-pregnene-3,20-dione with acetic acid in the presence of p-toluenesulfonic acid and trifluoroacetic anhydride under an Argon atmosphere and isolate and purify the resultant product to obtain 16-methylene-17α-acetoxy-21-chloro-4-pregnene-3,20-dione.

By substituting other lower alkanoic acids, e.g. butyric acid and valeric acid for acetic acid in the foregoing procedure, there is obtained the corresponding 17α-butyroxy and 17α-valeroxy derivatives, e.g. 16-methylene-17α-butyroxy - 21 - chloro - 4 - pregnene - 3,20-dione and 16-methylene-17α-valeroxy-21-chloro-4-pregnene-3,20-dione.

EXAMPLE 15

6-methoxy-16-methylene-17α-lower alkanoyloxy-21-halogeno-4,6-pregnadiene-3,20-dione (A) 6 - methoxy - 16 - methylene - 17α - lower alkanoyloxy-21-fluoro-4,6-pregnadiene-3,20-dione: In a manner similar to that described in Example 2, treat each of 16-methylene - 17α -acetoxy - 21 - fluoro - 4 - pregnene-3,20-dione, 16 - methylene - 17α - caprooxy - 21 - fluoro - 4-pregnene-3,20-dione and 16-methylene-17α-propionoxy-21-fluoro-4-pregnene-3,20-dione with cupric chloride hydrate in methanol. Isolate and purify each of the resultant products in a manner similar to that described to give respectively 6 - methoxy - 16 - methylene - 17α - acetoxy-21-fluoro-4,6-pregnadiene-3,20 - dione, 6 - methoxy - 16-methylene - 17α - caprooxy - 21 - fluoro 4,6 - pregadiene-3,20-dione and 6-methoxy-16-methylene-17α-propionoxy-21-fluoro-4,6-pregnadiene-3,20-dione.

(B) 6 - methoxy - 16 - methylene - 17α-lower alkanoyloxy - 21 - chloro - 4,6 - pregnadiene - 3,20 - dione: In a manner similar to that described in Example 2 treat each of 16 - methylene - 17α - acetoxy - 21-chloro-4-pregnene-3,20-dione, 16 - methylene - 17α - caprooxy - 21 - chloro-4-pregnene-3,20-dione, 16 - methylene - 17α - valeroxy-21-chloro-4-pregnene-3,20-dione and 16 - methylene - 17α-butyroxy-21-chloro-4-pregnene - 3,20 - dione with cupric chloride hydrate in methanol. Isolate and purify the resultant respective products to give 6-methoxy-16-methylene - 17α - acetoxy - 21 - chloro - 4,6- pregnadiene-3,20-dione, 6 - methoxy - 16 - methylene - 17α caprooxy - 21-chloro-4,6-pregnadiene-3,20-dione, 6 - methoxy - 16-methylene - 17α - valeroxy - 21 - chloro - 4,6 - pregnadiene-3,20-dione and 6-methoxy-16-methylene - 17α - butyroxy-21-chloro-4,6-pregnadiene-3,20-dione, respectively.

(C) Alternatively, the compounds of this example are prepared as follows: In a manner similar to that described in Example 2, treat each of 16-methylene-17α-hydroxy-21-fluoro-4-pregnene-3,20-dione and 16-methylene-17α-hydroxy-21-chloro - 4 - pregnene-3,20-dione with cupric chloride hydrate in methanol. Isolate and purify the resultant product in a manner similar to that described to give 6-methoxy-16-methylene-17α-hydroxy-21-fluoro-4,6-pregnadiene-3,20-dione and 6-methoxy-16-methylene-17α - hydroxy - 21 - chloro - 4,6 - pregnadiene - 3,20-dione, respectively.

In a manner similar to that described in Example 6B, treat each of 6-methoxy-16-methylene-17α-hydroxy-21-fluoro - 4,6 - pregnadiene - 3,20 - dione and 6 - methoxy-16-methylene-17α-hydroxy - 21 - chloro - 4,6 - pregnadiene-3,20-dione with a lower alkanoic acid such as acetic acid and propionic acid in the presence of trifluoroacetic anhydride and p-toluenesulfonic acid under an atmosphere of argon. Isolate and purify the resultant respective products to obtain 6-methoxy-16-methylene-17α-acetoxy - 21-fluoro - 4,6 - pregnadiene-3,20-dione and 6-methoxy-16-methylene - 17α - propionoxy - 21 - fluoro - 4,6 - pregnadiene - 3,20-dione, 6-methoxy-16-methylene-17α-acetoxy-21-chloro-4,6-pregnadiene-3,20-dione and 6 - methoxy-16-methylene-17α-propionoxy-21-chloro - 4,6 - pregnadiene-3,20-dione, respectively.

EXAMPLE 16

6-methoxy-16-ethylidene-17α-acetoxy-21-halogeno-4,6-pregnadiene-3,20-dione (A) 16β - ethyl-16α,17α-oxido-4-pregnene-3,20-dione: The compound of this example is prepared from 5,16-pregnadiene-3β-ol-20-one 3-acetate according to known procedures as follows.

Treat 5,16-pregnadiene-3β-ol-20-one 3-acetate in toluene with ethyl magnesium iodide followed by subsequent acetylation at C-3 of the resultant product by treatment with acetic anhydride in dry pyridine to give 16α-ethyl-5-pregnene-3β-ol-20-one 3-acetate. Brominate at C–17 by treatment with bromine in acetic acid to give 16α-ethyl-17α-bromo-5-pregnen-3β-ol-20-one 3-acetate. Treat the foregoing 16α-ethyl-17α-bromo derivative with dimethylformamide according to known procedures to yield 16-ethyl-5,16-pregnadiene-3β-ol-20-one 3-acetate which, upon treatment with alkaline hydrogen peroxide utilizing known methods produces 16β-ethyl-16α,17α-oxido-4-pregnene-3,20-dione.

(B) 16β - ethyl-16α,17α-oxido-21-iodo-4-pregnene-3,20-dione: To 0.5 g. of 16β-ethyl-16α,17α-oxido-4-pregnene-3,20-dione in 5.6 ml. of tetrahydrofuran and 3.4 ml. of methanol, add 0.75 g. of finely ground calcium oxide and 0.75 g. of iodine. Allow the reaction mixture to stand for about 1.5 hours during which period the initial dark brown color slowly changes to pale yellow. Dilute the reaction mixture with methylene chloride, filter and wash the filtrate successively with an aqueous solution of 3% sodium iodide then 4% sodium thiosulfate and finally with water alone. Then evaporate the washed filtrate to a residue comprising 16β - ethyl-16α,17α-oxido-21-iodo-4-pregnene-3,20-dione. Purify by crystallization from acetone/hexane.

(C) 16β - ethyl-16α,17α-oxido-21-fluoro-4-pregnene-3,-20-dione and 16β-ethyl-16α,17α-oxido-21-chloro-4-pregnene-3,20-dione: In a manner similar to that described in Example 14A, treat 16β-ethyl-16α,17α-oxido-21-iodo-4-pregnene-3,20-dione with silver fluoride in moist acetonitrile to obtain 16β-ethyl-16α,17α-oxido-21-fluoro-4-pregnene-3,20-dione.

In similar manner treat 16β-ethyl-16α,17α-oxido-21-iodo-4-pregnene-3,20-dione with silver chloride in moist acetonitrile according to the procedure of Eaxmple 14A to obtain 16β-ethyl-16α,17α-oxido-21-chloro-4-pregnene-3,20-dione.

(D) 16 - ethylidene - 17α-acetoxy-21-halogeno-4-pregnene-3,20-dione: In a manner similar to that described in Example 14B, treat each of 16B-ethyl-16α,17α-oxido-21-fluoro - 4 - pregnene - 3,20-dione and 16β-ethyl-16α,17α-oxido-21-chloro-4-pregnene-3,20-dione with acetic acid and trifluoroacetic anhydride. Isolate and purify the resultant respective products in a manner similar to that described to give 16-ethylidene-17α-acetoxy-21-fluoro-4-pregnene-3,20-dione and 16-ethylidene-17α-acetoxy-21-chloro-4-pregnene-3,20-dione.

(E) 6-methoxy-16-ethylidene-17α-acetoxy-21-halogeno-4,6-pregnadiene-3,20-dione: In a manner similar to that described in Example 2 treat each of 16-ethylidene-17α-acetoxy-21-fluoro-4-pregnene-3,20-dione and 16-ethylidene-17α-acetoxy-21-chloro-4-pregnene-3,20-dione with cupric chloride hydrate in methanol. Isolate and purify the resultant respective products in a manner similar to that described to obtain 6-methoxy-16-ethylidene-17-α-acetoxy-21-fluoro-4,6-pregnadiene-3,20-dione and 6-methoxy-16-ethylidene - 17α-acetoxy-21-chloro-4,6-pregnadiene-3,20-dione, respectively.

EXAMPLE 17

6-lower alkoxy-16-lower alkylidene-17α-acetoxy-21-halogeno-4,6-pregnadiene-3,20-dione (A) 16 - lower alkylidene-17α-acetoxy-21-halogeno-4-pregnene-3,6,20-trione: In a manner similar to that described in Example 9A, treat each of the following with p-toluenesulfonic acid in 80% aqueous acetic acid.

6-methoxy-16-methylene-17α-acetoxy-21-fluoro-4,6-pregnadiene-3,20-dione,
6-methoxy-16-methylene-17α-acetoxy-21-chloro-4,6-pregnadiene-3,20-dione,
6-methoxy-16-ethylidene-17α-acetoxy-21-fluoro-4,6-pregnadiene-3,20-dione, and
6-methoxy-16-ethylidene-17α-acetoxy-21-chloro-4,6-pregnadiene-3,20-dione.

Isolate and purify the resultant respective products in a manner similar to that described to obtain respectively 16-methylene-17α-acetoxy-21-fluoro-4-pregnene-3,6,20-trione,
16-methylene-17α-acetoxy-21-chloro-4-pregnene-3,6,20-trione,
16-ethylidene-17α-acetoxy-21-fluoro-4-pregnene-3,6,20-trione, and
16-ethylidene-17α-acetoxy-21-chloro-4-pregnene-3,6,20-trione.

(B) 6-lower alkoxy-16-lower alkylidene-17α-acetoxy-21-halogeno-4,6-pregnadiene-3,20-dione: In a manner similar to that described in Example 9B, treat each of the following with boron trifluoride etherate in ethyl alcohol.

16-methylene-17α-acetoxy-21-fluoro-4-pregnene-3,6,20-trione,
16-methylene-17α-acetoxy-21-chloro-4-pregnene-3,6,20-trione,
16-ethylidene-17α-acetoxy-21-fluoro-4-pregnene-3,6-20-trione, and
16-ethylidene-17α-acetoxy-21-chloro-4-pregnene-3,6,20-trione.

Isolate and purify the resultant respective products in a manner similar to that described to obtain respectively 6-ethoxy-16-methylene-17α-acetoxy-21-fluoro-4,6-pregnadiene-3,20-dione,
6-ethoxy-16-methylene-17α-acetoxy-21-chloro-4,6-pregnadiene-3,20-dione,
6-ethoxy-16-ethylidene-17α-acetoxy-21-fluoro-4,6-pregnadiene-3,20-dione, and
6-ethoxy-16-ethylidene-17α-acetoxy-21-chloro-4,6-pregnadiene-3,20-dione.

Similarly, by treating each of the starting compounds listed hereinabove with boron trifluoride etherate in n-butanol there are obtained the corresponding 6-butoxy compounds, 6-n-butoxy-16-methylene-17α-acetoxy-21-fluoro-4,6-pregnadiene-3,20-dione,
6-n-butoxy-16-methylene-17α-acetoxy-21-chloro-4,6-pregnadiene-3,20-dione,
6-n-butoxy-16-ethylidene-17α-acetoxy-21-fluoro-4,6-pregnadiene-3,20-dione, and
6-n-butoxy-16-ethylidene-17α-acetoxy-21-chloro-4,6-pregnadiene-3,20-dione, respectively.

EXAMPLE 18

1α,2α-cyclomethylene-6-lower alkoxy - 16-lower alkylidene - 17α acetoxy - 21 - halogeno - 4,6 - pregnadiene-3,20-dione (A) 6-lower alkoxy-16-lower alkylidene-17α-acetoxy-21-halogeno-1,4,6-pregnatriene-3,20-dione: In a manner similar to that described in Example 5, treat each of the following with 2,3-dichloro-5,6-dicyanobenzoquinone in benzene.

6-methoxy-16-methylene-17α-acetoxy-21-fluoro-4,6-pregnadiene-3,20-dione,
6-ethoxy-16-methylene-17α-acetoxy-21-fluoro-4,6-pregnadiene-3,20-dione,
6-methoxy-16-methylene-17α-acetoxy-21-chloro-4,6-pregnadiene-3,20-dione,
6-ethoxy-16-methylene-17α-acetoxy-21-chloro-4,6-pregnadiene-3,20-done,
6-methoxy-16-ethylidene-17α-acetoxy-21-fluoro-4,6-pregnadiene-3,20-dione,
6-ethoxy-16-ethylidene-17α-acetoxy-21-fluoro-4,6-pregnadiene-3,20-dione,
6-methoxy-16-ethylidene-17α-acetoxy-21-chloro-4,6-pregnadiene-3,20-dione,
6-ethoxy-16-ethylidene-17α-acetoxy-21-chloro-4,6-pregnadiene-3,20-dione.

Isolate and purify the respective products in a manner similar to Example 5 to obtain respectively, 6-methoxy-16-methylene-17α-acetoxy-21-fluoro-1,4,6-pregnatriene-3,20-dione,
6-ethoxy-16-methylene-17α-acetoxy-21-fluoro-1,4,6-pregnatriene-3,20-dione,
6-methoxy-16-methylene-17α-acetoxy-21-chloro-1,4,6-pregnatriene-3,20-dione,
6-ethoxy-16-methylene-17α-acetoxy-21-chloro-1,4,6-pregnatriene-3,20-dione,
6-methoxy-16-ethylidene-17α-acetoxy-21-fluoro-1,4,6-pregnatriene-3,20-dione,
6-ethoxy-16-ethylidene-17α-acetoxy-21-fluoro-1,4,6-pregnatriene-3,20-dione,
6-methoxy-16-ethylidene-17α-acetoxy-21-chloro-1,4,6-pregnatriene-3,20-dione,
6-ethoxy-16-ethylidene-17α-acetoxy-21-chloro-1,4,6-pregnatriene-3,20-dione.

(B) 1α,2α - cyclomethylene-6-lower alkoxy-16-lower alkylidene - 17α - acetoxy - 21-halogeno-4,6-pregnadiene-3,20-dione: In a manner similar to that described in Example 7a, treat each of the following pregnatrienes with trimethylsulfoxonium iodide and sodium hydride in dimethyl sulfoxide under an argon atmosphere.

6-methoxy-16-methylene-17α-acetoxy-21-fluoro-1,4,6-pregnatriene-3,20-dione,
6-ethoxy-16-methylene-17α-acetoxy-21-fluoro-1,4,6-pregnatriene-3,20-dione,
6-methoxy-16-methylene-17α-acetoxy-21-chloro-1,4,6-pregnatriene-3,20-dione, 6-ethoxy-16-methylene-17α-acetoxy-21-chloro-1,4,6-pregnatriene-3,20-dione,
6-methoxy-16-ethylidene-17α-acetoxy-21-fluoro-1,4,6-pregnatriene-3,20-dione,
6-ethoxy-16-ethylidene-17α-acetoxy-21-fluoro-1,4,6-pregnatriene-3,20-dione,
6-methoxy-16-ethylidene-17α-acetoxy-21-chloro-1,4,6-pregnatriene-3,20-dione,
6-ethoxy-16-ethylidene-17α-acetoxy-21-chloro-1,4,6-pregnatriene-3,20-dione.

Isolate and purify the resultant respective products in a manner similar to that in Example 7A to obtain respectively, 1α,2α-cyclomethylene-6-methoxy-16-methylene-17α-acetoxy-21-fluoro-4,6-pregnadiene-3,20-dione,
1α,2α-cyclomethylene-6-ethoxy-16-methylene-17α-acetoxy-21-fluoro-4,6-pregnadiene-3,20-dione,
1α,2α-cyclomethylene-6-methoxy-16-methylene-17α-acetoxy-21-chloro-4,6-pregnadiene-3,20-dione,
1α,2α-cyclomethylene-6-ethoxy-16-methylene-17α-acetoxy-21-chloro-4,6-pregnadiene-3,20-dione,
1α,2α-cyclomethylene-6-methoxy-16-ethylidene-17α-acetoxy-21-fluoro-4,6-pregnadiene-3,20-dione,
1α,2α-cyclomethylene-6-ethoxy-16-ethylidene-17α-acetoxy-21-fluoro-4,6-pregnadiene-3,20-dione,
1α,2α-cyclomethylene-6-methoxy-16-ethylidene-17α-acetoxy-21-chloro-4,6-pregnadiene-3,20-dione,
1α,2α-cyclomethylene-6-ethoxy-16-ethylidene-17α-acetoxy-21-chloro-4,6-pregnadiene-3,20-dione.

PHARMACEUTICAL FORMULATIONS OF 6-METHOXY - 16 - METHYLENE - 17α-ACETOXY-4,6-PREGNADIENE-3,20-DIONE

I.—Tablet formulations

Formula A (5 mg.):  Milligrams per tablet
6 - methoxy - 16 - methylene-17α-acetoxy-4,6-pregnadiene - 3,20-dione _____ 5.0
Starch, food grade _____ 5.0
Lactose, USP (spray dried) _____ 89.5
Magnesium stearate, USP _____ 0.5
                                                    ———
                                                    100.0

Formula B (25 mg.):
6 - methoxy - 16 - methylene - 17α - acetoxy-4,6 - pregnadiene - 3,20-dione _____ 25.0
Starch, food grade _____ 10.0
Lactose, USP (spray dried) _____ 164.0
Magnesium stearate, USP _____ 1.0
                                                    ———
                                                    200.0

Pass the steroid through a high speed mill equipped with a 100 to 150 mesh screen. Blend the milled steroid with the starch in a suitable mixing vessel. Add an equal weight of the spray dried lactose to the blend and mix until uniform. Combine the resultant blend with the remainder of the spray dried lactose and mix until uniform. Charge the magnesium stearate with a portion of the active tablet mix and blend. Blend the magnesium stearate mix with the remaining active tablet base. Continue mixing until uniform. Compress to target weight (100.0 mg. for 5 mg. tablet and 200.0 mg. for 25 mg. tablet).

II.—Capsule formulation

Formula:  Milligrams per capsule
6 - methoxy - 16 - methylene-17α-acetoxy-4,6-pregnadiene-3,20-dione _____ 5.0
Lactose, USP (spray dried) _____ 292.0
Magnesium stearate, USP _____ 3.0
                                                    ———
                                                    300.0

Blend ingredients until uniformly mixed. Fill into hard gelatin capsule.

III.—Parenteral suspension

Formula A (5 mg.):  Milligrams per milliliter
6 - methoxy - 16 - methylene-17α-acetoxy-4,6-pregnadiene-3,20-dione _____ 5.00
Methyl cellulose 15 cps., USP _____ 0.05
Sodium citrate, dihydrate _____ 6.00
Benzyl alcohol, NF _____ 9.00
Methylparaben, USP _____ 1.80
Propylparaben, USP _____ 0.20
Water for injection, USP, q.s. ad _____ 1.00

Formula B (25 mg.):
6 - methoxy - 16 - methylene-17α-acetoxy-4,6-pregnadiene-3,20-dione _____ 25.00
Methyl cellulose 15 cps., USP _____ 0.25
Sodium citrate, dihydrate _____ 30.00
Benzyl alcohol, NF _____ 9.00
Methylparaben, USP _____ 1.80
Propylparaben, USP _____ 0.20
Water for injection, USP, q.s. ad _____ 1.00

Charge 45 l. of water for injection into a suitable stainless steel vessel and heat to 85–90° C. With vigorous agitation, slowly sprinkle the methyl cellulose into the hot water (5 gm. for Formula A or 25 gm. for Formula B). Agitate until the methyl cellulose is thoroughly dispersed and wetted. Add approximately 30 l. of cold (0.5° C.) water for injection. Cool the entire mixture to 8° C. Dissolve the sodium citrate (600 gm. for Formula A or 3000 gm. for Formula B) in enough water for injection to make 5 l. of solution. Slowly and with agitation add this solution to the cooled methyl cellulose solution. Dissolve the parabens (180 gm. of methyl and 20 gm. of propyl) in 900 gm. of benzyl alcohol which has been heated to 30° C. Charge this solution to the chilled methyl cellulose cellulose solution. Bring the resulting solution to 90 l. with water for injection and agitate until uniform. In a sterile area, pass the batch through a sterile filter. Aseptically transfer about 3.5 l. of the sterile methyl cellulose solution to a separate container reserving the remainder of the batch in a sterile stainless steel mixing tank. Slurry the steroid in a sterile colloid mill with about 2 l. of the separated methyl cellulose solution and add the slurry to the solution in the mixing tank. Rinse the slurry container and the mill with the remaining 1.5 l. of reserved methyl cellulose solution and add the rinse to the mixing tank. Rinse the slurry container and mill with 2 l. of water for injection and add the rinse to the mixing tank. Adjust the volume in the mixing tank to 100 l. with water for injection and agitate until uniform. The batch affords 100 l. of sterile suspension having the proportions of Formula A or Formula B.

Although the invention has been described above in terms of 6 - methoxy-16-methylene-17α-acetoxy-4,6-pregnadiene-3,20-dione as the essential active ingredient, other 6 - alkoxy - 16-lower alkylidene-17α-lower alkanoyloxy-6-dehydroprogesterones of our invention as defined by Formula I hereinabove may be used in the above formulations and may be used for the treatment of benign prostatic hypertrophy in a manner similar to that described for 6 - methoxy - 16 - methylene - 17α-acetoxy-6-dehydro-progesterone, the daily dosage of compound to be administered being dependent upon the severity of the patient's condition and the relative anti-androgenic activity of the compound being administered with respect to the preferred 6 - methoxy - 16 - methylene - 17α-acetoxy-6-dehydroprogesterone of our invention.

We claim:
1. A compound having the following structural formula:

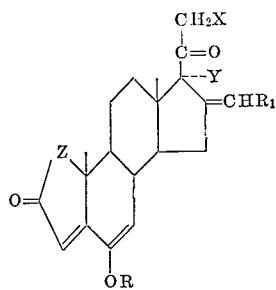

wherein R is lower alkyl; $R_1$ is a member selected from the group consisting of hydrogen and lower alkyl; X is a member selected from the group consisting of hydrogen, fluorine, and chlorine; Y is lower alkanoyloxy; and Z is a member selected from the group consisting of

—$CH_2$—$CH_2$— and

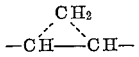

2. A compound of claim 1 wherein X is hydrogen.
3. A compound of claim 1 wherein X is hydrogen and Z is —$CH_2$—$CH_2$—.
4. A compound of claim 1 wherein $R_1$ and X are hydrogen and Z is —$CH_2$—$CH_2$—.
5. A compound of claim 1 wherein R is methyl, $R_1$ and X are hydrogen, said compound being a member selected from the group consisting of 6-methoxy-16-methylene-17α - lower alkanoyloxy - 4,6-pregnadiene-3,20-dione and 1α,2α - cyclomethylene - 6 - methoxy - 16-methylene-17α-lower alkanoyloxy-4,6-pregnadiene-3,20-dione.
6. A compound of claim 1 wherein R is methyl, $R_1$ and X are hydrogen, Y is acetoxy, and Z is —$CH_2$—$CH_2$—, said compound being 6-methoxy-16-methylene-17α-acetoxy-4,6-pregnadiene-3,20-dione.
7. A compound of claim 1 wherein R is ethyl, $R_1$ and X are hydrogen, Y is acetoxy and Z is —$CH_2$—$CH_2$—, said compound being 6-ethoxy-16-methylene-17α-acetoxy-4,6-pregnadiene-3,20-dione.
8. A compound of claim 1 wherein R is methyl, $R_1$ and X are hydrogen, Y is acetoxy, and Z is

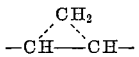

said compound being 1α,2α-cyclomethylene-6-methoxy-16-methylene-17α-acetoxy-4,6-pregnadiene-3,20-dione.
9. A compound having the following structural formula:

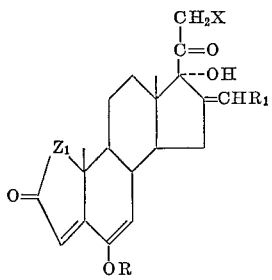

wherein R is lower alkyl; $R_1$ is a member selected from the group consisting of hydrogen and lower alkyl; X is a member selected from the group consisting of hydrogen, fluorine, and chlorine; and $Z_1$ is a member selected from the group consisting of —$CH_2$—$CH_2$—, —CH=CH—, and

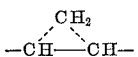

and when $Z_1$ is —CH=CH—, the 17-lower alkanoate esters thereof.

10. A compound according to claim 9 wherein R is methyl, $R_1$ and X are hydrogen, said compound being a member selected from the group comprising 6-methoxy-16-methylene-17α-hydroxy - 4,6 - pregnadiene-3,20-dione, 6 - methoxy-16-methylene-17α-hydroxy-1,4,6-pregnatriene-3,20-dione, 1α,2α-cyclomethylene-6-methoxy-16-methylene-17α-hydroxy - 4,6 - pregnadiene-3,20-dione, and 6-methoxy-16-methylene - 17α - hydroxy-1,4,6-pregnatriene-3,20-dione.
11. A 17α-lower alkanoate compound according to claim 9 wherein R is methyl, $R_1$ and X are hydrogen, and Z is —$CH_2$—$CH_2$— and wherein said 17-lower alkanoate is 17-acetate, said compound being 6-methoxy-16-methylene-17α-acetoxy-1,4,6-pregnatriene-3,20-dione.
12. A compound having the following structural formula:

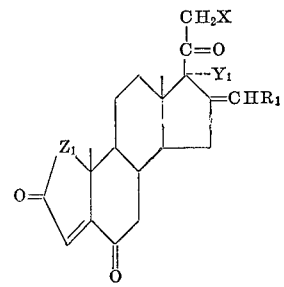

wherein $R_1$ is a member selected from the group consisting of hydrogen and lower alkyl; X is a member selected from the group consisting of hydrogen, fluorine, and chlorine; $Y_1$ is a member selected from the group consisting of hydroxy and lower alkanoyloxy; and $Z_1$ is a member selected from the group consisting of

—$CH_2$—$CH_2$—

—CH=CH—, and

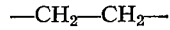

13. A compound according to claim 12 wherein $R_1$ and X are hydrogen; $Y_1$ is lower alkanoyloxy; and $Z_1$ is

—$CH_2$—$CH_2$— said compound being 16-methylene-17α-lower alkanoyloxy-4-pregnene-3,6,20-trione.
14. A compound according to claim 13 wherein $Y_1$ is acetoxy, said compound being 16-methylene-17α-acetoxy-4-pregnene-3,6,20-trione.
15. The process for the preparation of 6-alkoxy-16-alkylidene-6-dehydroprogesterones having the following structural Formula I:

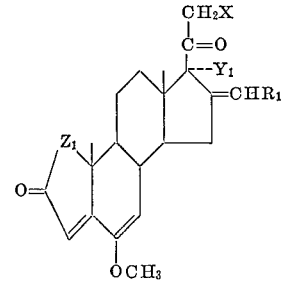

wherein $R_1$ is a member selected from the group consisting of hydrogen and lower alkyl; X is a member selected from the group consisting of hydrogen, fluorine and chlorine, $Y_1$ is a member selected from the group consisting of hydroxy and lower alkanoyloxy, and $Z_1$ is a member slected from the group comprising —$CH_2$—$CH_2$—,

—CH=CH— and

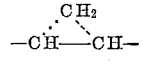

which comprises treating a 6-unsubstituted-16-lower alkylidene-17α-lower alkanoyloxyprogesterone selected from the group consisting of 16-alkylideneprogesterone of the following Formula II and the 3-enol ethers and the 3-enol esters thereof defined by Formula III;

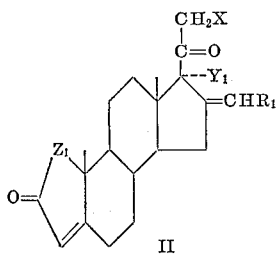

II

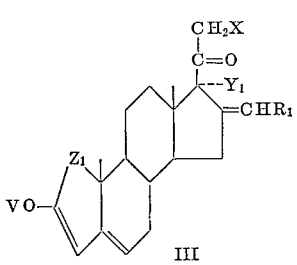

III wherein $R_1$, X, $Y_1$ and $Z_1$ are as hereinabove defined and V is a member selected from the group consisting of lower alkyl and lower alkanoyloxy, with a reagent selected from the group consisting of cupric chloride and cupric bromide in methanol.

16. The process of claim 15 including the subsequent step of isolating the compound of Formula I thereby formed.

17. The process of claim 15 when said reagent is cupric chloride in methanol.

18. The process of claim 15 when carried out with a compound of Formula II.

19. The process of claim 15 wherein said 6-unsubstituted-16-lower alkylidene - 17α - lower alkanoyloxyprogesterone is 16-methylene-17α-acetoxyprogesterone, said reagent is cupric chloride in methanol; said process being the preparation of 6-methoxy-16-methylene-17α-acetoxy-4,6-pregnadiene-3,20-dione which comprises treating 16-methylene-17α-acetoxyprogesterone with cupric chloride in methanol.

20. The process for the preparation of 6-alkoxy-16-alkylidene-6-dehydroprogesterones defined by the following structural Formula I:

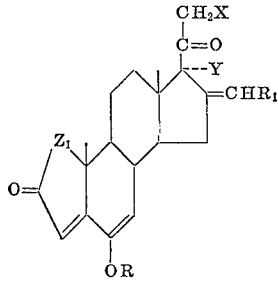

I wherein R is a lower alkyl, X is a member selected from the group consisting of H, fluorine, and chlorine; Y is lower alkanoyloxy; and $Z_1$ is a member selected from the group consisting of —CH₂—CH₂—; —CH=CH—; and

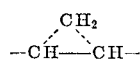

which comprises treating a 6-keto progesterone defined by the following structural Formula II:

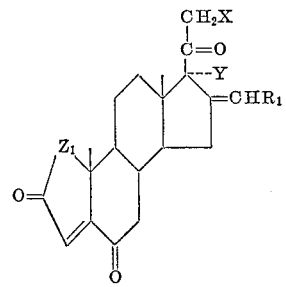

II wherein R, X, Y, and $Z_1$ are as herein defined, with boron trifluoride in the presence of a lower alkanol.

21. The process of claim 20 including the step of isolating the compound of Formula I formed thereby.

22. The process of claim 20 wherein said alkanol is ethanol whereby is formed a 6-ethoxy compound of Formula I.

23. The process of claim 20 wherein said starting compound is a 6-ketoprogesterone of Formula II wherein $R_1$ and X are hydrogen, Y is acetoxy, and Z is

—CH₂—CH₂— and wherein said lower alkanol is ethanol, which comprises treating 6-keto-16-methylene-17α-acetoxy-4-pregnene-3,20-dione with boron trifluoride in ethanol whereby is formed 6-ethoxy-16-methylene-17α-acetoxy-4,6-pregnadiene-3,20-dione.

24. The process of claim 20 including the step of preparing said 6-keto compound of Formula II by treating a 6-methoxy-16-alkylidene - 17α - alkanoyloxy-6-dehydroprogesterone of the following formula:

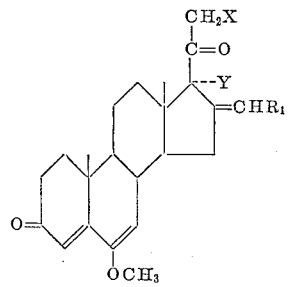

wherein $R_1$ is a member selected from the group consisting of hydrogen and lower alkyl, X is a member selected from the group consisting of hydrogen, fluorine and chlorine, and Y is lower alkanolyloxy; with p-toulenesulfonic acid in aqueous acetic acid.

25. The process of claim 24 wherein $R_1$ and X are hydrogen, and Y is acetoxy, said process comprising treating 6-methoxy-16-methylene-17α-acetoxy-4,6-pregnadiene-3,20-dione with p-toluenesulfonic acid in 80% aqueous acetic acid, and treating the thereby formed 6-keto-16-methylene-17α-acetoxy-4-pregnene-3,20-dione with boron trifluoride in ethanol, whereby is formed 6-ethoxy-16-methylene-17α-acetoxy-4,6-pregnadiene-3,20-dione.

26. The process of claim 15 wherein about four moles of said reagent selected from the group consisting of cupric chloride and cupric bromide are used per mole of said 6-unsubstituted-16-lower alkylidene-17α-lower alkanoyloxy progesterone selected from the group consisting of 16-alkylideneprogesterones of Formula II and the 3-enol ethers and 3-enol esters thereof defined by Formula III.

References Cited

UNITED STATES PATENTS

| | | | |
|---|---|---|---|
| 3,462,465 | 8/1969 | Holden et al. | 260—397.4 |
| 3,466,371 | 9/1969 | Wiechert et al. | 424—240 |

HENRY A. FRENCH, Primary Examiner

U.S. Cl. X.R.

260—239.55 R, 397.47; 424—243

UNITED STATES PATENT OFFICE
CERTIFICATE OF CORRECTION

Patent No. 3,629,303           Dated December 21, 1971

Inventor(s) Richard Rausser and Robert Tiberi

It is certified that error appears in the above-identified patent and that said Letters Patent are hereby corrected as shown below:

Column 8, lines 20 and 21, "oxide in a manner similar to that described hereinbelow. process aspect of our invention described hereinbelow." should read --oxide in a manner similar to that described in the third process aspect of our invention described hereinbelow.--. Column 10, line 70, "$[\alpha]_D$-61-6°" should read --$[\alpha]_D$-61.6°--. Column 11, line 16, "90 ml." should read --900 ml.--. Column 11, line 25, "3.5 g." should read --33.5 g.--. Column 11, line 66, "via the enol ether)" should read --(via the enol acylate)--. Column 13, line 33, "$[\alpha]_D$97.5°" should read --$[\alpha]_D$+97.5°--. Column 13, line 44, "and dropwise" should read --add dropwise--. Column 13, line 52, "Purify the" should read --Purify by--. Column 13, line 63, "12.2" should read --1.22--. Column 15, line 23, "4,6-pregnatriene" should read --4,6-pregnadiene--. Column 15, line 25, "4,6-pregnatriene" should read --4,6-pregnadiene--. Column 16, line 45, "left away" should read --left after--. Column 17, line 19, "6-methyl" should read --6-methoxy--. Column 21, line 8, "16B-ethyl" should read --16β-ethyl--.

Claim 24, column 28, line 48, "lower alkanolyloxy" should read -- lower alkanoyloxy --.

Signed and sealed this 22nd day of August 1972.

(SEAL)
Attest:

EDWARD M. FLETCHER, JR.          ROBERT GOTTSCHALK
Attesting Officer                Commissioner of Patents